(12) United States Patent
Miyauchi et al.

(10) Patent No.: US 12,418,735 B2
(45) Date of Patent: Sep. 16, 2025

(54) SOLID-STATE IMAGING DEVICE, METHOD FOR DRIVING SOLID-STATE IMAGING DEVICE, AND ELECTRONIC APPARATUS

(71) Applicant: Brillnics Singapore Pte. Ltd., Singapore (SG)

(72) Inventors: Ken Miyauchi, Tokyo (JP); Isao Takayanagi, Tokyo (JP); Kazuya Mori, Tokyo (JP)

(73) Assignee: BRILLNICS SINGAPORE PTE. LTD., Singapore (SG)

( * ) Notice: Subject to any disclaimer, the term of this patent is extended or adjusted under 35 U.S.C. 154(b) by 102 days.

(21) Appl. No.: 18/553,982

(22) PCT Filed: Apr. 4, 2022

(86) PCT No.: PCT/JP2022/017040
§ 371 (c)(1),
(2) Date: Oct. 4, 2023

(87) PCT Pub. No.: WO2022/215682
PCT Pub. Date: Oct. 13, 2022

(65) Prior Publication Data
US 2024/0196116 A1 Jun. 13, 2024

(30) Foreign Application Priority Data
Apr. 5, 2021 (JP) .................. 2021-064260

(51) Int. Cl.
*H04N 25/771* (2023.01)
*H04N 23/667* (2023.01)
(Continued)

(52) U.S. Cl.
CPC ......... *H04N 25/771* (2023.01); *H04N 23/667* (2023.01); *H04N 25/51* (2023.01);
(Continued)

(58) Field of Classification Search
CPC .... H04N 25/771; H04N 23/667; H04N 25/51; H04N 25/57; H04N 25/63; H04N 25/7795; H04N 25/75; H04N 25/77
(Continued)

(56) References Cited

U.S. PATENT DOCUMENTS 7,164,114 B2    1/2007   Lai et al.
7,719,583 B1 *  5/2010   Lee .................... H04N 25/65
                                              348/308
(Continued)

FOREIGN PATENT DOCUMENTS

JP    2005-278135 A    10/2005
JP    2005-295346 A    10/2005
(Continued)

OTHER PUBLICATIONS

Patent Cooperation Treaty, International Search Report issued in PCT/JP2022/017040, Jun. 21, 2022, pp. 1-2, English Translation.

*Primary Examiner* — Lin Ye
*Assistant Examiner* — Chan T Nguyen
(74) *Attorney, Agent, or Firm* — Pillsbury Winthrop Shaw Pittman LLP

(57) ABSTRACT

A pixel circuit 200 includes a readable pixel 210, a comparator 220, and a selector counter circuit 230. The readable pixel 210 performs photoelectric conversion at a photodiode PD11 and produces a readable signal corresponding to an illuminance condition of incident light. The readable pixel 210 includes an overflow path extending to a floating diffusion FD11. The comparator 220 compares a voltage signal (SFout) read out from the readable pixel 210 against a reference signal Vref and outputs a comparison result signal Vout indicating the result of the comparison. The selector counter circuit 230 includes a selector circuit for selecting an external clock or the output Vout from the
(Continued)

comparator and a counter circuit for counting the output from the selector circuit.

18 Claims, 22 Drawing Sheets

(51) Int. Cl.
    *H04N 25/51*     (2023.01)
    *H04N 25/57*     (2023.01)
    *H04N 25/63*     (2023.01)
    *H04N 25/76*     (2023.01)

(52) U.S. Cl.
    CPC ............. *H04N 25/57* (2023.01); *H04N 25/63* (2023.01); *H04N 25/7795* (2023.01)

(58) Field of Classification Search
    USPC .......................................................... 348/297
    See application file for complete search history.

(56) References Cited

U.S. PATENT DOCUMENTS

| | | | |
|---|---|---|---|
| 9,197,834 B2 * | 11/2015 | Kayahan | H03M 1/144 |
| 9,324,745 B2 | 4/2016 | Yazici et al. | |
| 11,425,320 B2 * | 8/2022 | Chu | H04N 25/57 |
| 11,991,465 B2 * | 5/2024 | Suess | H04N 25/74 |
| 2005/0195304 A1 | 9/2005 | Nitta et al. | |
| 2009/0190021 A1 | 7/2009 | Nitta et al. | |
| 2010/0181464 A1 | 7/2010 | Veeder | |
| 2010/0245649 A1 | 9/2010 | Nitta et al. | |
| 2011/0199526 A1 | 8/2011 | Nitta et al. | |
| 2014/0016011 A1 | 1/2014 | Nitta et al. | |
| 2014/0285697 A1 | 9/2014 | Nitta et al. | |
| 2016/0088252 A1 | 3/2016 | Nitta et al. | |
| 2016/0295145 A1 | 10/2016 | Nitta et al. | |
| 2017/0310915 A1 | 10/2017 | Nitta et al. | |
| 2017/0353683 A1 | 12/2017 | Sakakibara et al. | |
| 2018/0184032 A1 | 6/2018 | Nitta et al. | |
| 2018/0324376 A1 | 11/2018 | Nitta et al. | |
| 2020/0027910 A1 * | 1/2020 | Okura | H10F 39/802 |
| 2020/0396401 A1 * | 12/2020 | Chu | H04N 25/59 |

FOREIGN PATENT DOCUMENTS

| | | |
|---|---|---|
| JP | 2015-216592 A | 12/2015 |
| JP | 2020-017724 A | 1/2020 |
| WO | 2016/114153 A1 | 7/2016 |

* cited by examiner

SOLID-STATE IMAGING DEVICE, METHOD FOR DRIVING SOLID-STATE IMAGING DEVICE, AND ELECTRONIC APPARATUS

CROSS-REFERENCE TO RELATED APPLICATIONS

This application is the U.S. National Phase Application of PCT/JP2022/017040, filed on Apr. 4, 2022, which claims the benefit of priority from Japanese Patent Application Serial No. 2021-064260 (filed on Apr. 5, 2021), the contents of which are incorporated herein by reference in entirety.

TECHNICAL FIELD

The present invention relates to a solid-state imaging device, a method for driving a solid-state imaging device, and an electronic apparatus.

BACKGROUND

Solid-state imaging devices (image sensors) including photoelectric conversion elements for detecting light and generating charges are embodied as complementary metal oxide semiconductor (CMOS) image sensors, which have been in practical use. The CMOS image sensors have been widely applied as parts of various types of electronic apparatuses such as digital cameras, video cameras, surveillance cameras, medical endoscopes, personal computers (PCs), mobile phones and other portable terminals (mobile devices).

The CMOS image sensors include, for each pixel, a photodiode (a photoelectric conversion element) and a floating diffusion (FD) amplifier having a floating diffusion (FD). The mainstream design of the reading operation in the CMOS image sensors is a column parallel output processing of selecting one of the rows in the pixel array and reading the pixels in the selected row simultaneously in the column output direction.

Various types of pixel signal reading (output) circuits have been proposed for CMOS image sensors of the column parallel output scheme. Among them, one of the most advanced circuits is a circuit that includes an analog-to-digital converter (ADC) for each column and obtains a pixel signal in a digital format (see, for example, Patent Literatures 1 and 2).

In this CMOS image sensor having column-parallel ADCs (column-wise-AD CMOS image sensor), AD conversion is performed in such a manner that a comparator compares the pixel signal (voltage signal) against a so-called RAMP wave and a counter of a later stage performs digital CDS.

The CMOS image sensors of this type are capable of transferring signals at high speed, but disadvantageously incapable of reading the signals with a global shutter.

To address this issue, a digital pixel sensor has been proposed that has, in each pixel, an ADC including a comparator (and additionally a memory part), so that the sensor can realize a global shutter according to which the exposure to light can start and end at the same timing in all of the pixels of the pixel array part (see, for example, Patent Literatures 3 and 4).

The above-described conventional CMOS image sensor constituted by a digital pixel sensor is capable of realizing global shutter function. In addition, if an ADC including a comparator is arranged in each pixel and reading is performed in a predetermined mode, the conventional CMOS image sensor is capable of achieving widened dynamic range.

The dynamic range can be widened by, for example, reading two types of signals having different integration durations from the same pixel of the image sensor and combining the read two types of signals, or by combining a signal with a small dynamic range read from a high-sensitive pixel and a signal with a widened dynamic range read from a low-sensitive pixel.

Patent Literature 5 presents a unit pixel configuration for capturing infrared ray images. The unit pixel includes two input stages covering both low and high light levels, and also an internal automatic input selection circuit for increasing the dynamic range. Patent Literature 5 discloses, as feasible digital implementation, a technique of applying pulse frequency modulation (PFM) ADC for the unit pixel.

Patent Literature 6 discloses a digital read-out system pixel circuit including an extension counter and PFM capability for accomplishing excellent quantization noise characteristics.

FIGS. 1 and 2 are here referred to in order to describe the basic configuration and function of the PFM. FIG. 1 shows the configuration of a digital read-out system pixel circuit having a PFM function according to a first example. FIG. 2 shows the configuration of a digital read-out system pixel circuit having a PFM function according to a second example.

A pixel circuit 1 shown in FIG. 1 includes a photodiode PD1, a reset transistor RST-Tr, a comparator 2, and a counter 3.

In the pixel circuit 1, the comparator 2 compares the voltage at the charge storage node ND1 of the photodiode PD1 against reference voltage Vref1 (=VSA1), which is equivalent to the full well voltage VSA1 of the photodiode PD1. If the node voltage ND1 reaches the full well voltage VSA1, the output from the comparator 2 is fed back to the gate of the reset transistor RST-Tr as a feedback reset signal FRST, which brings the reset transistor RST-Tr into the conduction state. Stated differently, the feedback resetting can reset the charges stored in the photodiode PD1. The counter 3 counts how many times the photodiode PD1 is reset.

A pixel circuit 1A shown in FIG. 2 has a transfer transistor TG-Tr connected between the charge storage node ND1 of the photodiode PD1 and a floating diffusion FD1 serving as an output node. A control signal TG can control whether the transfer transistor TG-Tr is in the conduction state. In the pixel circuit 1A, a logic circuit 4 is provided in the feedback channel of the feedback reset signal FRST, and delay circuits 5-1 and 5-2 are provided and connected to the output side of the comparator 2 and to the input side of the logic circuit 4 to address the delays caused by the logic circuit 4.

In the pixel circuit 1A, the transfer transistor TG-Tr is controlled to remain in the conduction state (on state) during the exposure period and in the non-conduction state (off state) during the reset phase of the floating diffusion FD1.

RELEVANT REFERENCE

List of Relevant Patent Literature

Patent Literature 1: Japanese Patent Application Publication No. 2005-278135
Patent Literature 2: Japanese Patent Application Publication No. 2005-295346

Patent Literature 3: U.S. Pat. No. 7,164,114 B2 FIG. 4
Patent Literature 4: US 2010/0181464 A1
Patent Literature 5: U.S. Pat. No. 9,324,745 B2
Patent Literature 6: U.S. Pat. No. 9,197,834 B2

SUMMARY

The pixel circuits 1 and 1A shown in FIGS. 1 and 2, however, present the following disadvantages.

As configured without a transfer transistor TG-Tr, the pixel circuit 1 shown in FIG. 1 is significantly disturbed by the dark current of the photodiode PD1. There are difficulties in reading low signals produced by the photodiode PD1 under a low illuminance condition in the above-described manner.

Although the pixel circuit 1A shown in FIG. 2 has a transfer transistor TG-Tr, the dark current of the photodiode PD1 at the silicon interface under the transfer transistor TG-Tr is still a critical issue. Likewise, there are difficulties in reading low signals produced by the photodiode PD1 under a low illuminance condition in the above-described manner. As including the logic circuit (NAND, NOR) 4 for controlling the transfer transistor TG-Tr, the pixel circuit 1A faces serious difficulties in achieving a reduced pixel size.

The present invention is designed to provide a solid-state imaging device, a method for driving a solid-state imaging device, and an electronic apparatus that are capable of reading low signals produced under a low illuminance condition with low noise while keeping the sensitivity and full well unchanged and also capable of achieving a reduced pixel size.

A first aspect of the present invention provides a solid-state imaging device including: a readable pixel configured to perform photoelectric conversion, the readable pixel being configured to produce a readable signal corresponding to an illuminance condition of incident light; a comparator configured to compare a voltage signal read from the readable pixel against a reference signal and output a comparison result signal corresponding to a result of the comparison; and a selector counter circuit including a selector circuit and a counter circuit, the selector circuit being configured to select an external clock or an output from the comparator, the counter circuit being configured to count an output from the selector circuit. The readable pixel includes: a photoelectric conversion element configured to store therein, in an exposure period, charges corresponding to an amount of the incident light; a transfer element configured to remain in a non-conduction state during the exposure period and to remain in a conduction state during a transfer period to transfer the charges stored in the photoelectric conversion element; a floating diffusion configured to hold the charges transferred thereto via the transfer element so that the charges are read out as a voltage signal; at least one reset element configured to perform a reset operation of discharging the charges stored in the floating diffusion; and an overflow path configured to allow charges overflowing from the photoelectric conversion element to overflow toward a region where the floating diffusion is formed. The readable pixel, the comparator, the selector circuit and the counter circuit: under a high illuminance condition, if the voltage signal corresponding to the charges held in the floating diffusion reaches reference voltage, perform a pulse frequency modulation (PFM) mode operation, according to which the comparison result signal from the comparator is applied to perform feedback resetting to allow the floating diffusion to perform self-resetting, and the selector counter circuit counts a reset frequency of the floating diffusion in response to the comparison result signal; and under a low illuminance condition, perform a dual sampling read-out mode operation using the charges stored in the photoelectric conversion element and overflow charges.

A second aspect of the present invention provides a method for driving a solid-state imaging device. The solid-state imaging device includes: a readable pixel configured to perform photoelectric conversion, the readable pixel being configured to produce a readable signal corresponding to an illuminance condition of incident light; a comparator configured to compare a voltage signal read from the readable pixel against a reference signal and output a comparison result signal corresponding to a result of the comparison; and a selector counter circuit including a selector circuit and a counter circuit, the selector circuit being configured to select an external clock or an output from the comparator, the counter circuit being configured to count an output from the selector circuit. The readable pixel includes: a photoelectric conversion element configured to store therein, in an exposure period, charges corresponding to an amount of the incident light; a transfer element configured to remain in a non-conduction state during the exposure period and to remain in a conduction state during a transfer period to transfer the charges stored in the photoelectric conversion element; a floating diffusion configured to hold the charges transferred thereto via the transfer element so that the charges are read out as a voltage signal; at least one reset element configured to perform a reset operation of discharging the charges stored in the floating diffusion; and an overflow path configured to allow charges overflowing from the photoelectric conversion element to overflow toward a region where the floating diffusion is formed. Under a high illuminance condition, if the voltage signal corresponding to the charges held in the floating diffusion reaches reference voltage, a pulse frequency modulation (PFM) mode operation is performed, according to which the comparison result signal from the comparator is applied to perform feedback resetting to allow the floating diffusion to perform self-resetting, and the selector counter circuit counts a reset frequency of the floating diffusion in response to the comparison result signal. Under a low illuminance condition, a dual sampling read-out mode operation is performed using the charges stored in the photoelectric conversion element and overflow charges.

A third aspect of the present invention provides an electronic apparatus including: a solid-state imaging device; and an optical system for forming a subject image on the solid-state imaging device. The solid-state imaging device includes: a readable pixel configured to perform photoelectric conversion, the readable pixel being configured to produce a readable signal corresponding to an illuminance condition of incident light; a comparator configured to compare a voltage signal read from the readable pixel against a reference signal and output a comparison result signal corresponding to a result of the comparison; and a selector counter circuit including a selector circuit and a counter circuit, the selector circuit being configured to select an external clock or an output from the comparator, the counter circuit being configured to count an output from the selector circuit. The readable pixel includes: a photoelectric conversion element configured to store therein, in an exposure period, charges corresponding to an amount of the incident light; a transfer element configured to remain in a non-conduction state during the exposure period and to remain in a conduction state during a transfer period to transfer the charges stored in the photoelectric conversion element; a floating diffusion configured to hold the charges transferred thereto via the transfer element so that the charges are read out as a voltage signal; at least one reset element configured to perform a reset operation of discharging the charges stored in the floating diffusion; and an overflow path configured to allow charges overflowing from the photoelectric conversion element to overflow toward a region where the floating diffusion is formed. The readable pixel, the comparator, the selector circuit and the counter circuit: under a high illuminance condition, if the voltage signal corresponding to the charges held in the floating diffusion reaches reference voltage, perform a pulse frequency modulation (PFM) mode operation, according to which the comparison result signal from the comparator is applied to perform feedback resetting to allow the floating diffusion to perform self-resetting, and the selector counter circuit counts a reset frequency of the floating diffusion in response to the comparison result signal; and under a low illuminance condition, perform a dual sampling read-out mode operation using the charges stored in the photoelectric conversion element and overflow charges.

ADVANTAGEOUS EFFECTS

According to the present invention, low signals produced under a low illuminance condition can be read with low noise while the sensitivity and full well are kept unchanged and a reduced pixel size can be also achieved.

DESCRIPTION OF THE PREFERRED EMBODIMENTS

Embodiments of the present invention will be hereinafter described with reference to the drawings.

First Embodiment

Figure 1:
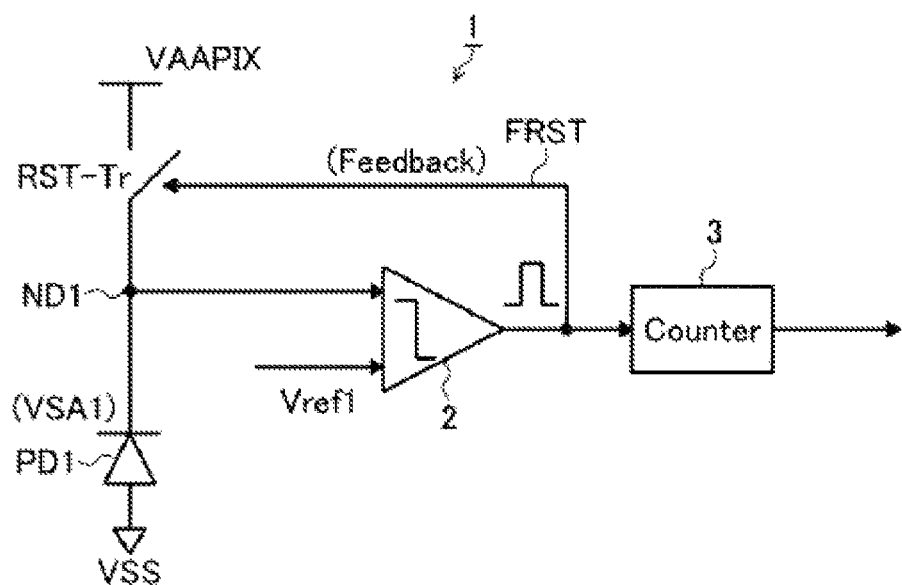
FIG. 1 shows the configuration of a digital read-out system pixel circuit having a PFM function according to a first example.
Figure 2:
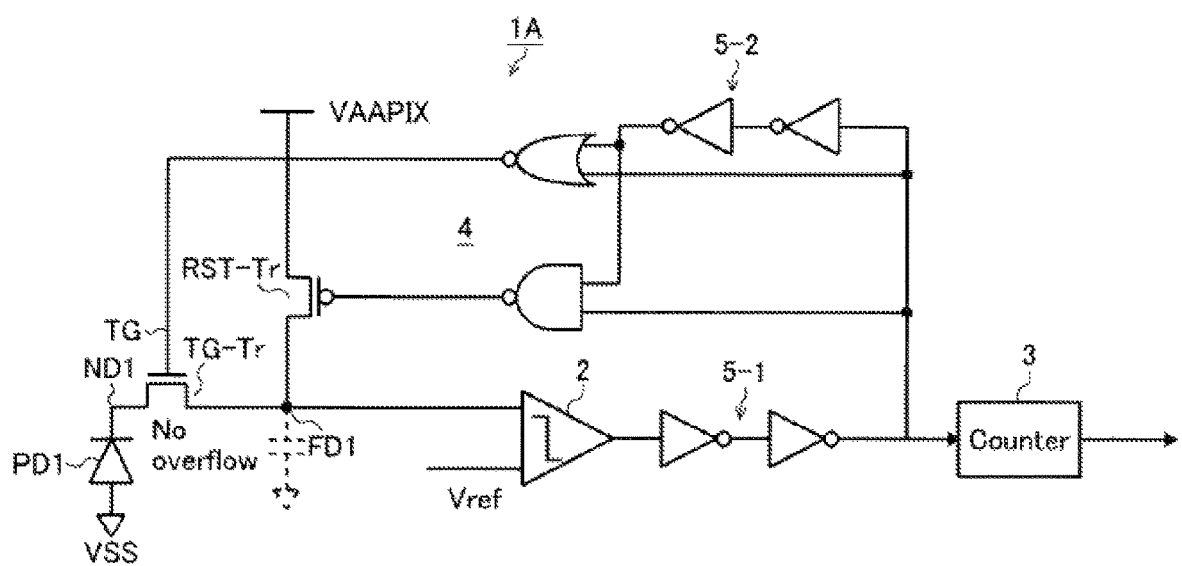
FIG. 2 shows the configuration of a digital read-out system pixel circuit having a PFM function according to a second example.
Figure 3:
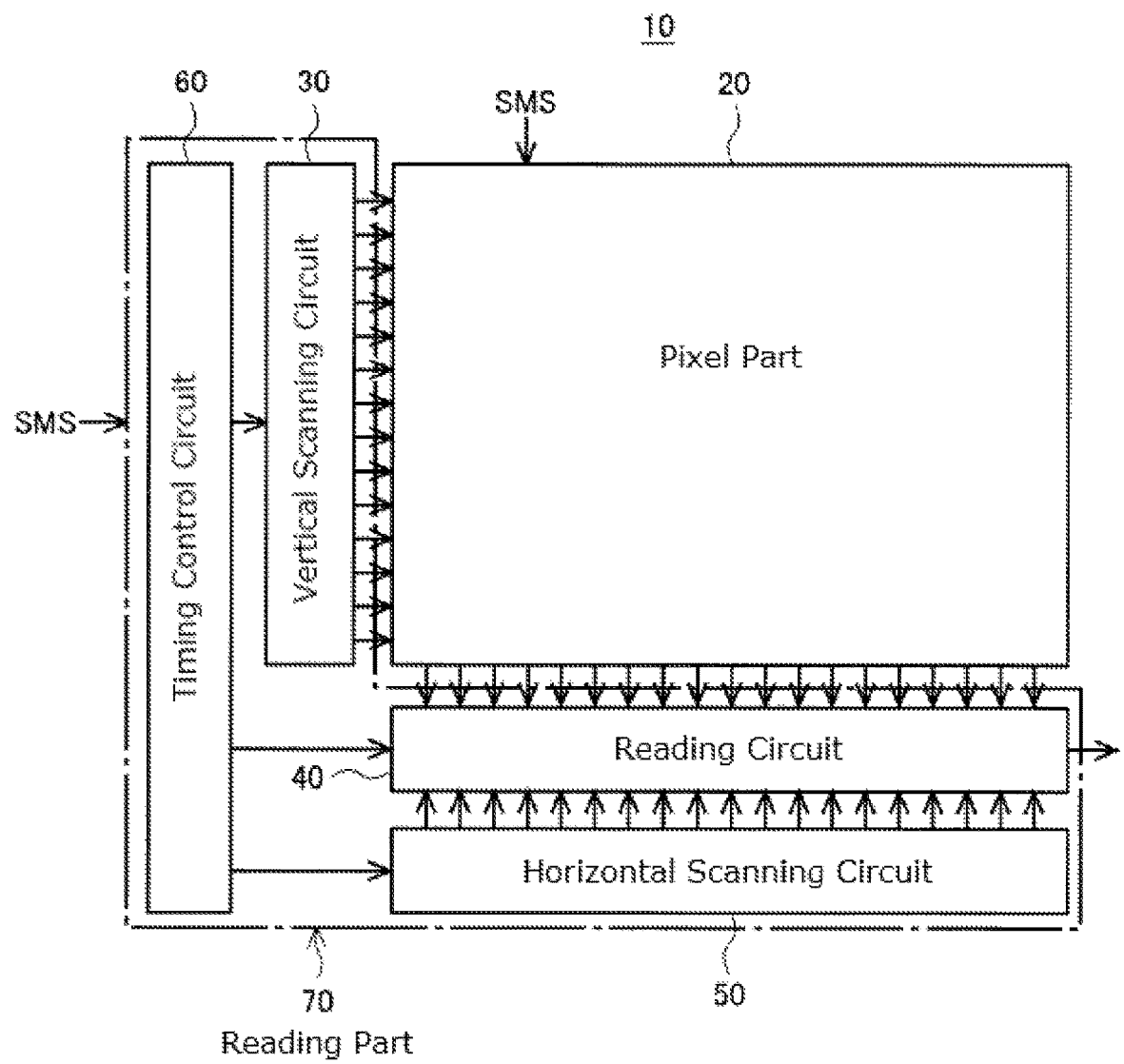
FIG. 3 is a block diagram showing an example configuration of a solid-state imaging device according to a first embodiment of the present invention.
Figure 4:
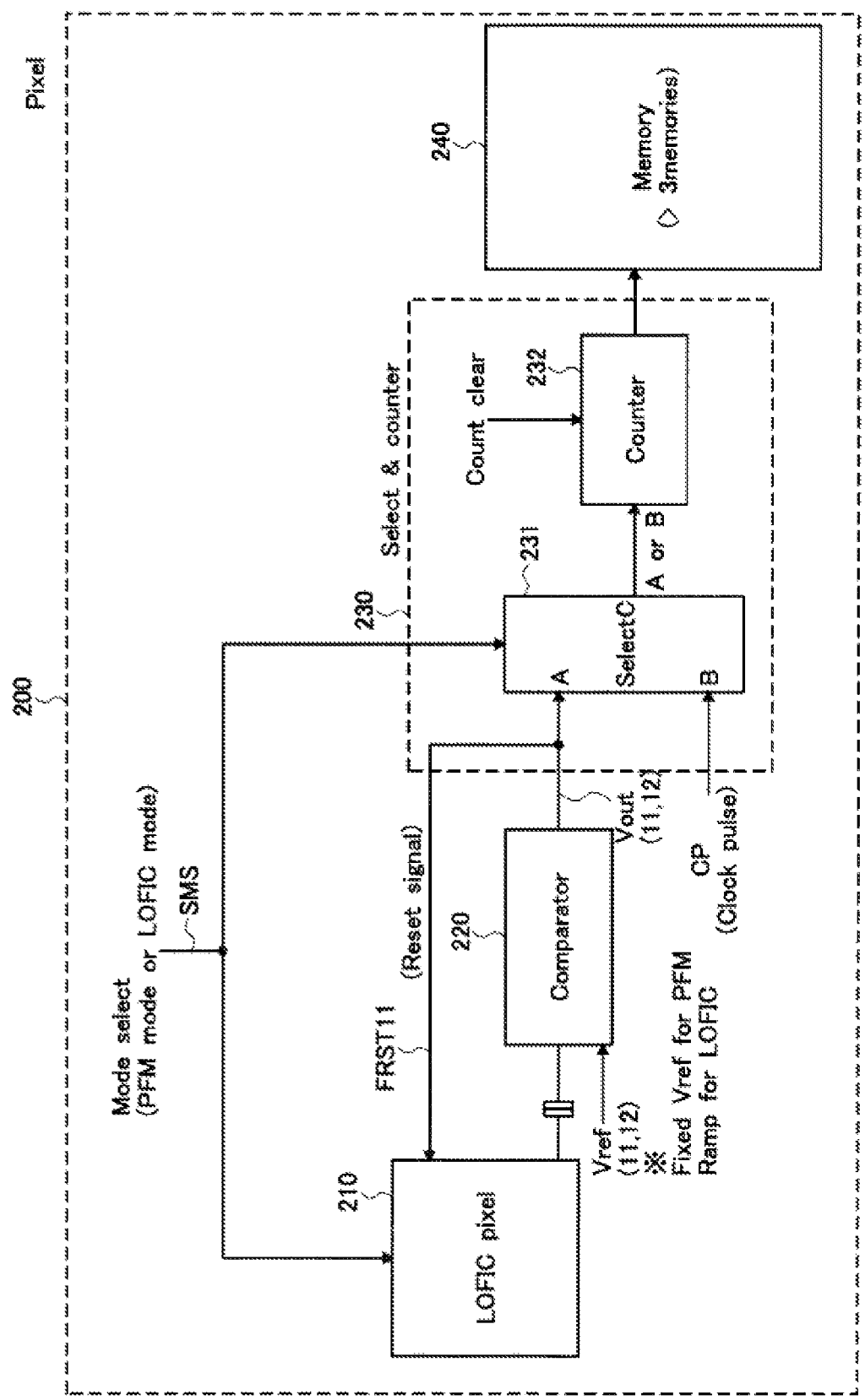
FIG. 4 is a block diagram showing an example basic configuration of a pixel circuit of the solid-state imaging device according to the first embodiment of the present invention.

FIG. 3 is a block diagram showing an example configuration of a solid-state imaging device relating to a first embodiment of the present invention. FIG. 4 is a block diagram showing an example basic configuration of a pixel circuit of the solid-state imaging device according to the first embodiment of the present invention. In this embodiment, a solid-state imaging device 10 is constituted by, for example, a CMOS image sensor.

As shown in FIG. 3, the solid-state imaging device 10 is constituted mainly by a pixel part 20 serving as an image capturing part, a vertical scanning circuit (a row scanning circuit) 30, a reading circuit (a column reading circuit) 40, a horizontal scanning circuit (a column scanning circuit) 50, and a timing control circuit 60. Among these components, for example, the vertical scanning circuit 30, the reading circuit 40, the horizontal scanning circuit 50, and the timing control circuit 60 constitute a reading part 70 for reading out pixel signals.

In the solid-state imaging device 10 relating to the first embodiment, the pixel part 20 has pixel circuits 200 arranged therein in a matrix pattern. As will be described in detail, each pixel circuit 200 includes a readable pixel 210, a comparator 220, a selector counter circuit 230, and a memory circuit 240. The readable pixel 210 performs photoelectric conversion at a photodiode PD11 serving as a photoelectric conversion element and produces a readable signal corresponding to an illuminance condition of incident light. The readable pixel 210 includes an overflow path extending to a floating diffusion FD 11. The comparator 220 compares a voltage signal (SFout) read out from the readable pixel 210 against a reference signal Vref and outputs a comparison result signal Vout indicating the result of the comparison. The selector counter circuit 230 selects a counting clock of a counter in response to the comparison result signal Vout from the comparator 220 and performs counting in synchronization with the selected clock. The memory circuit 240 stores digital data produced by the selector counter circuit 230 based on the comparison result signal Vout from the comparator 220.

The readable pixel 210, comparator 220 and selector counter circuit 230 operate in a pulse frequency modulation (PFM) mode under a high illuminance condition and in a dual sampling read-out (for example, LOFIC) mode under a low illuminance condition using the charges stored in the photoelectric conversion element and the overflow charges.

In the PFM mode under the high illuminance condition, if the voltage signal determined by the voltage held in the floating diffusion FD11 reaches the reference voltage of the comparator, the comparison result signal Vout from the comparator 220 is applied to perform feedback resetting FRST11 to allow the floating diffusion FD11 to perform self-resetting, and the number of times the floating diffusion FD11 is reset (the reset frequency of the floating diffusion FD11) is counted by the selector counter circuit 230 in response to the comparison result signal Vout from the comparator 220.

In the solid-state imaging device 10 relating to the first embodiment of the present invention, the pixel circuit 200 has a lateral overflow integration capacitor (LOFIC), which will be described in detail below. Under a low illuminance condition, the pixel circuit 200 operates in the dual sampling read-out mode (LOFIC mode) using a dual conversion scheme based on the charges stored in the photodiode PD11 serving as the photoelectric conversion element and the overflow charges.

In the pixel circuit 200, the readable pixel 210 and selector counter circuit 230 can selectively operate in the PFM mode or dual sampling read-out mode in response to a mode selection signal SMS.

In the PFM mode, a first comparison result signal Vout11 is applied as a feedback reset signal FRST11 to bring the reset element into the conduction state, so that the floating diffusion FD11 is reset to a predetermined potential VAAPIX in the readable pixel 210.

In the PFM mode, a first reference signal (reference voltage) Vref11, which is at a certain (fixed) level and equivalent to the full well voltage of the photodiode PD11 serving as the photoelectric conversion element, is fed to the comparator 220. If the voltage signal determined by the charges held in the floating diffusion FD11 reaches the first reference signal level Vref11, the first comparison result signal Vout11 is output from the comparator 220 to the readable pixel 210 and selector counter circuit 230. In the dual sampling read-out mode, a second reference signal Vref12, which has a ramp waveform and shows a continuous change, is fed to the comparator 220. The voltage signal determined by the voltage held in the floating diffusion FD11 is compared against the second reference signal Vref12, and the result is output as a second comparison result signal Vout12 to the selector counter circuit 230.

The selector counter circuit 230 counts the first comparison result signal Vout11 from the comparator 220 in the PFM mode, and latches the second comparison result signal Vout12 in synchronization with a clock having a predetermined frequency in the dual sampling read-out mode.

According to the example shown in FIG. 4, the selector counter circuit 230 includes a selector 231 and a counter 232. The selector 231 has an input terminal A connected to the output line of the comparison result signal Vout from the comparator 220, an input terminal B connected to the feeding line of the clock pulse CP, and an output terminal C connected to the input terminal of the counter 232 (for example, the clock terminal). The selector 231 connects the output terminal C to a selected one of the input terminals A and B in response to the mode selection signal SMS, to select the signal to be input into the counter 232. Specifically, if the mode selection signal SMS indicates the PFM mode, the selector 231 connects the input terminal A to the output terminal C, to feed the comparison result signal Vout11 from the comparator 220 to the counter 232. If the mode selection signal SMS indicates the dual sampling read-out mode, the selector 231 connects the input terminal B to the output terminal C, to feed the clock pulse CP having a predetermined frequency to the counter 232. The counter 232 counts the first comparison result signal Vout11 from the comparator 220 in the PFM mode and latches the second comparison result signal Vout12 in synchronization with the clock pulse CP in the dual sampling read-out mode.

In the first embodiment, the PFM mode is selected under a high illuminance condition and in an exposure period PEXP following resetting of the floating diffusion FD11 and the photodiode PD11 serving as the photoelectric conversion element. The PFM mode is followed by the dual sampling read-out mode. In the PFM mode, in the exposure period PEXP, overflowing of the charges from the photodiode PD11 to the floating diffusion FD11, self-resetting of the floating diffusion FD11 resulting from the feedback resetting through the comparison result signal Vout from the comparator 220, and counting of the number of times the floating diffusion FD11 is reset (the reset frequency of the floating diffusion FD11) by the selector counter circuit 230 are performed repeatedly. In the present embodiment, the number of times the floating diffusion FD11 is reset is counted to obtain the amount of actually generated charges. If pulse light or other sorts of abnormal light is incident on a solid-state imaging device during an exposure period, the solid-state imaging device may produce erroneously detected signals. The present embodiment can avoid such errors.

In the first embodiment, the reading part 70 can perform first conversion gain mode reading and second conversion gain mode reading in a read-out period. The reading part 70 reads pixel signals with a first conversion gain corresponding to a first capacitance in the first conversion gain mode reading, and with a second conversion gain corresponding to a second capacitance (different from the first capacitance) in the second conversion gain mode reading. In other words, the solid-state imaging device 10 of the first embodiment switches, in a read-out period for outputting signals, the mode between the first conversion gain (for example, high conversion gain: HCG) mode and the second conversion gain (low conversion gain: LCG) mode in the respective pixels for the charges (electrons) produced by photoelectric conversion in a single exposure period (integration period), so that the solid-state imaging device 10 can output both of bright and dark signals and thus achieve an increased dynamic range.

The following first describes in detail the specific example configuration of the readable pixel 210 of the solid-state imaging device 10 and then an example configuration of a pinned diode (PPD) part and an overflow path. In the following description, the readable pixel 210 has an LOFIC configuration, for example.

<Specific Example Configuration of Readable Pixel 210>

Figure 5:
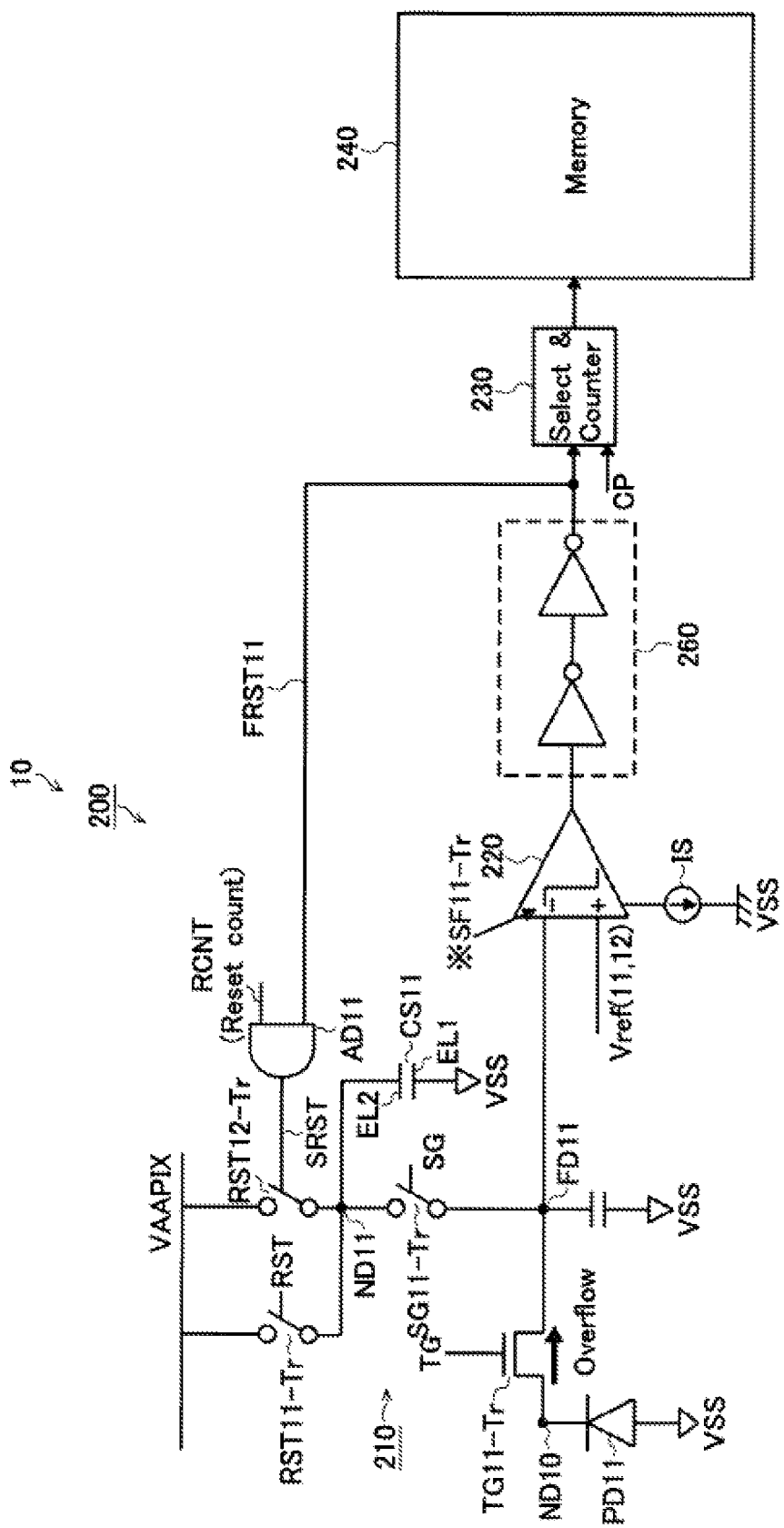
FIG. 5 is a circuit diagram showing an example configuration of a readable pixel of the pixel circuit relating to the first embodiment of the present invention.

FIG. 5 is a circuit diagram showing an example configuration of the readable pixel of the pixel circuit relating to the first embodiment of the present invention.

In the pixel part 20, the pixel circuits 200 are arranged in a two-dimensional matrix comprised of N rows and M columns, and each pixel circuit 200 includes the readable pixel 210 constituted by a photodiode (photoelectric conversion element) and an in-pixel amplifier.

As shown in, for example, FIG. 5, the readable pixel 210 includes a photodiode PD11 serving as a photoelectric conversion element, a transfer transistor TG11-Tr serving as a charge transfer gate part (a transfer element), a reset transistor RST11-Tr serving as a reset element, a self-reset reset transistor RST12-Tr, an AND gate AD11, a storage transistor SG11-Tr serving as a storage element, and a storage capacitor CS11 serving as a storage capacitance element. In the first embodiment, one of the transistors constituting the differential transistor pair of the comparator 220 also serves as a source follower transistor SF11-Tr serving as a source follower element, which will be described below.

The photodiode PD11 generates signal charges (electrons) in an amount determined by the amount of the incident light and stores the same. A description will be hereinafter given of a case where the signal charges are electrons and each transistor is an n-type transistor. However, it is also possible that the signal charges are holes or each transistor is a p-type transistor.

In each readable pixel 210, the photodiode (PD) is a pinned photodiode (PPD). The substrate surface for forming the photodiode (PD) has a surface level due to dangling bonds or other defects. Therefore, a lot of charges (dark current) are generated due to heat energy, as a result of which the signals fail to be read out correctly. The pinned photodiode (PPD) has the charge storage part buried in the substrate, thereby reducing mixing of the dark current into signals.

The transfer transistor TG11-Tr is connected between the pinned photodiode (PPD) and the floating diffusion FD11 and controlled through a control signal TG. The transfer transistor TG11-Tr remains selected and in the conduction state during a period in which the control signal TG is at the high (H) level, to transfer to the floating diffusion FD11 the charges (electrons) produced by photoelectric conversion by the photodiode PD11 and then stored in the storage node ND10.

In the example shown in FIG. 5, the reset transistor RST11-Tr is connected between a power supply potential VAAPIX and the storage transistor SG11-Tr connected to the floating diffusion FD11, and controlled through a control signal RST. The reset transistor RST11-Tr remains selected and in the conduction state in the period in which the control signal RST is at the H level, to reset the floating diffusion FD11 to the power supply potential VAAPIX while the storage transistor SG11-Tr is in the conduction state.

In the example shown in FIG. 5, the self-reset reset transistor RST12-Tr is connected between the power supply potential VAAPIX and the storage transistor SG11-Tr connected to the floating diffusion FD11 and in parallel with the reset transistor RST11-Tr. The self-reset reset transistor RST12-Tr is controlled through an output control signal SRST from the AND gate AD11. The self-reset reset transistor RST12-Tr remains selected and in the conduction state in the period in which the control signal SRST is at the H level, to reset the floating diffusion FD11 to the power supply potential VAAPIX while the storage transistor SG11-Tr is in the conduction state.

In the first embodiment, the self-resetting is performed in the PFM mode in the following manner. The self-reset reset transistor RST12-Tr and storage transistor SG11-Tr remain in the conduction state, so that the floating diffusion FD11 and the storage capacitor CS11 are reset.

In the first embodiment, the floating diffusion FD11 is selectively connected to the storage capacitor CS11 through the storage transistor SG11-Tr, so that the capacitance of the floating diffusion FD11 is changed between a first capacitance and a second capacitance, so that the conversion gain can be switched between a first conversion gain (high conversion gain: HCG) corresponding to the first capacitance and a second conversion gain (low conversion gain: LCG) corresponding to the second capacitance.

For example, the source of the storage transistor SG11-Tr is connected to the floating diffusion FD11. The storage capacitor CS11 has a first electrode EL1 connected to the reference potential VSS (e.g., the ground potential GND) and a second electrode EL2 connected to the drain of the storage transistor SG11-Tr serving as a capacitance connection node ND11. The storage transistor SG11-Tr is controlled by a control signal SG applied to the gate thereof through a control line. The storage transistor SG11-Tr remains selected and in the conduction state in the period in which the control signal SG is at the H level, to connect the floating diffusion FD11 and the storage capacitor CS11.

The first conversion gain (high conversion gain: HCG) signal read-out operation in the dual sampling read-out mode is performed with the storage transistor SG11-Tr remaining in the non-conduction state so that the charges of the floating diffusion FD11 are separated from the charges of the storage capacitor CS11. The second conversion gain (the low conversion gain: LCG) signal read-out operation in the dual sampling read-out mode is performed with the storage transistor SG11-Tr remaining in the conduction state so that the charges of the floating diffusion FD11 and the charges of the storage capacitor CS11 are combined.

In the example shown in FIG. 5, the storage transistor SG11-Tr is connected between the floating diffusion FD11 and the reset transistors RST11-Tr and RST12-Tr, and the storage capacitor CS11 is connected between the connection node ND11 of the storage transistor SG11-Tr and the reference potential VSS. The manner of connecting these components is not limited to such. For example, the reset transistor RST11-Tr and storage transistor SG11-Tr may be individually and directly connected to the floating diffusion FD11.

The AND gate AD11 has input terminals one of which is connected to the feeding line of a reset count signal RCNT and the other of which is connected to the feeding line of the comparison result signal Vout from the comparator 220, and the output terminal of the control signal SRST is connected to the gate of the self-reset reset transistor RST12-Tr. The reset count signal RCNT is in synchronization with the mode selection signal SMS. If the mode selection signal SMS is at the high level to indicate the PFM mode period, the reset count signal RCNT is fed at the high level for the same period of time. If the mode selection signal SMS is at the low level to indicate the dual sampling read-out mode, the reset count signal RCNT is fed at the low level for the same period of time. The AND gate AD11 calculates a logical AND between the reset count signal RCNT, which is fed at the high level in the PFM mode period, and the comparison result signal Vout from the comparator 220. The control signal SRST is thus output at the high level during the period in which the comparison result signal Vout is at the high level. As a result, while the control signal SRST is at the high level, the self-reset reset transistor RST12-Tr remains in the conduction state.

In the first embodiment, the source follower transistor SF11-Tr serving as the source follower element also serves as one of the transistors of the differential transistor pair of the comparator 220. The following now describes a specific example configuration of the comparator 220.

<Example Configuration of Comparator 220>

The comparator 220 relating to the first embodiment has a differential transistor pair and an active load circuit. The differential transistor pair is constituted by transistors a first one of which receives at the gate thereof signal voltage VSL and a second one of which receives at the gate thereof fixed voltage serving as the first reference signal Vref11 or a ramp signal RAMP serving as the second reference signal Vref12. The differential transistor pair is configured to compare the signal voltage VSL against the reference voltage Vref or ramp signal RAMP The active load circuit is configured to form a current mirror when connected to the drain side of the first transistor and the drain side of the second transistor.

Figure 6:
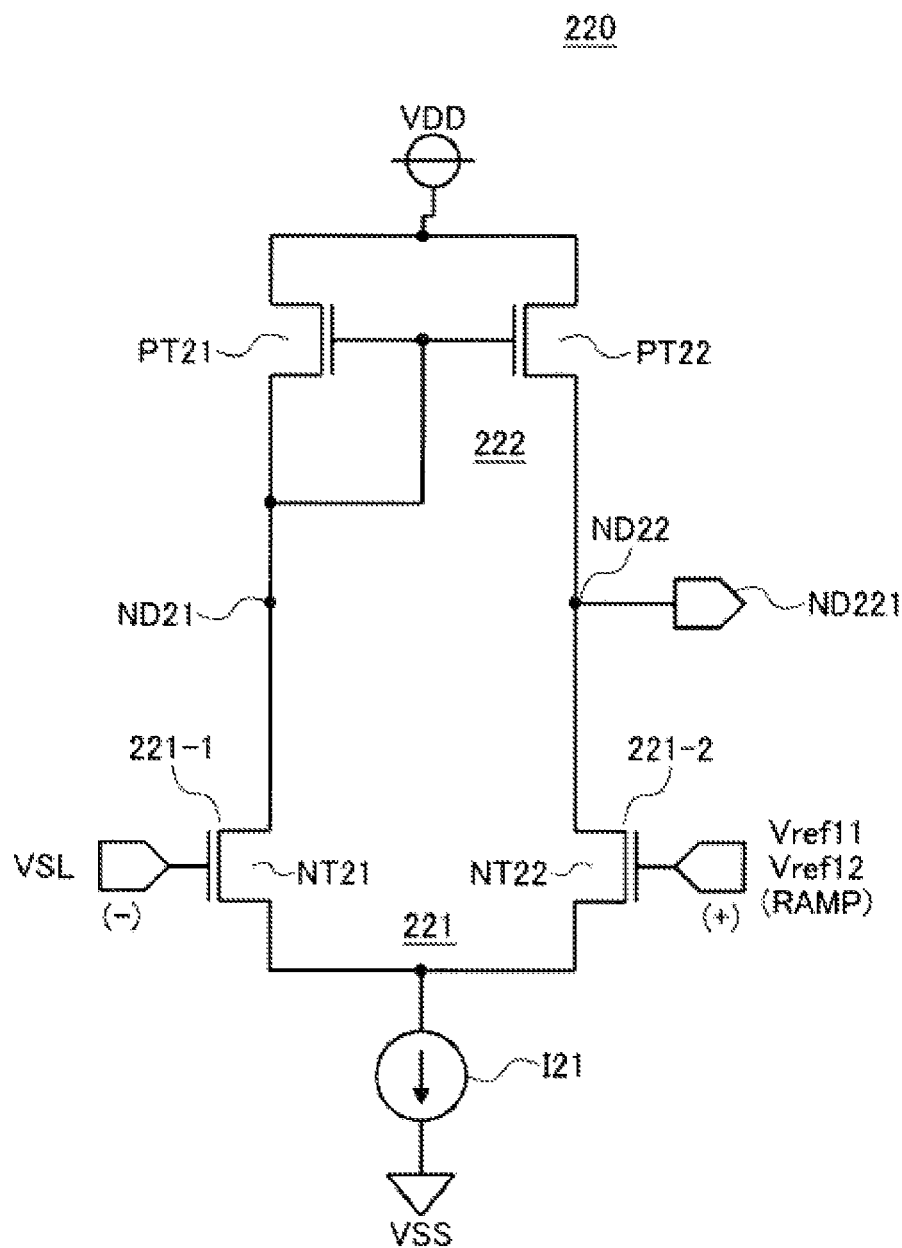
FIG. 6 is a circuit diagram showing an example configuration of a comparator relating to the first embodiment of the present invention.

FIG. 6 is a circuit diagram showing an example configuration of the comparator relating to the first embodiment.

The comparator 220 in FIG. 6 includes PMOS transistors PT21, PT22, NMOS transistors NT21 and NT22, a current source 121, and nodes ND21 and ND22.

The source of the PMOS transistor PT21 and the source of the PMOS transistor PT22 are connected to each other, and the connection node therebetween is connected to the power supply potential VDD. The source of the NMOS transistor NT21 and the source of the NMOS transistor NT22 are connected to each other, and the connection node therebetween is connected to the current source 121 connected to the reference potential VSS.

The drain of the PMOS transistor PT21 is connected to the drain of the NMOS transistor NT21, and the connecting point therebetween forms a node ND21. The drain of the PMOS transistor PT22 is connected to the drain of the NMOS transistor NT22, and the connecting point therebetween serves as a node ND22. The node ND21 is connected to the gates of the PMOS transistors PT21 and PT22, and the node ND22 is connected to the output node ND221.

Among these constituents, the NMOS transistors NT21 and NT22 the sources of which are connected to each other constitute a differential transistor pair 221. The NMOS transistor NT21 constitutes a first one of the transistors (221-1), and the NMOS transistor NT22 constitutes a second one of the transistors (221-2). The voltage signal VSL is fed to the gate of the NMOS transistor NT21 constituting the first transistor 221-1, and the fixed voltage serving as the first reference signal Vref11 or the ramp signal RAMP serving as the second reference signal Vref12 is fed to the gate of the NMOS transistor NT22 constituting the second transistor 221-2.

The active load circuit 222, which is configured to form a current mirror with the PMOS transistors PT21 and PT22, is arranged on the drain side of the NMOS transistor NT21 constituting the first transistor and on the drain side of the NMOS transistor NT22 constituting the second transistor.

In the comparator 220 described above, the connection node ND22 between the drain of the NMOS transistor NT22 serving as the second transistor and the drain of the PMOS transistor PT22 constituting the active load circuit 222 is connected to the output node ND221 for outputting the comparison result signal Vout. Stated differently, the comparator 220 outputs the comparison result signal Vout from the drain side of the NMOS transistor NT22 serving as the second transistor.

For example, the comparator 220 compares the voltage signal VSL against the first reference signal Vref11 or second reference signal Vref12. If the voltage signal VSL becomes equal to the first or second reference signal Vref11 or Vref12, the output level of the comparison result signal Vout is inverted from the non-active level (for example, low level) to the active level (high level).

The source follower transistor SF11-Tr, which also serves as one of the differential transistors of the comparator 220, outputs a read-out signal (voltage signal) of a column output generated by converting the charges at the floating diffusion FD11 into a voltage signal with a gain determined by the capacitance. These operations are performed concurrently and in parallel in the pixels in a given one of the rows, because the gates of the transfer transistors TG11-Tr, reset transistors RST11-Tr and RST12-Tr, and storage transistors SG1-Tr in each of the rows are connected together.

Since the pixel part 20 includes the pixel circuits 200 arranged in N rows and M columns, N control lines are provided for each of the control signals, and M vertical signal lines are provided. In FIG. 3, the control lines for each row are represented as one row-scanning control line.

The vertical scanning circuit 30 drives the pixels in shutter and read-out rows through the row-scanning control lines under control of the timing control circuit 60. Further, the vertical scanning circuit 30 outputs, according to address signals, row selection signals for row addresses of the reading rows from which signals are read out and the shutter rows in which the charges stored in the photodiodes PD11 are reset.

The reading circuit 40 includes a plurality of column signal processing circuits (not shown) arranged corresponding to the column outputs of the pixel part 20, and the reading circuit 40 may be configured such that the plurality of column signal processing circuits can perform column parallel processing.

The horizontal scanning circuit 50 scans the signals processed in the plurality of column signal processing circuits of the reading circuit 40, transfers the signals in a horizontal direction, and outputs the signals to a signal processing circuit (not shown).

The timing control circuit 60 generates timing signals required for signal processing in the pixel part 20, the vertical scanning circuit 30, the reading circuit 40, the horizontal scanning circuit 50, and the like.

The above description has outlined the configurations and functions of the parts of the solid-state imaging device 10.

The following now describes in detail the configuration and function of the readable pixel according to the first embodiment.

<Specific Example Configuration of Readable Pixel 210>

Figure 7:
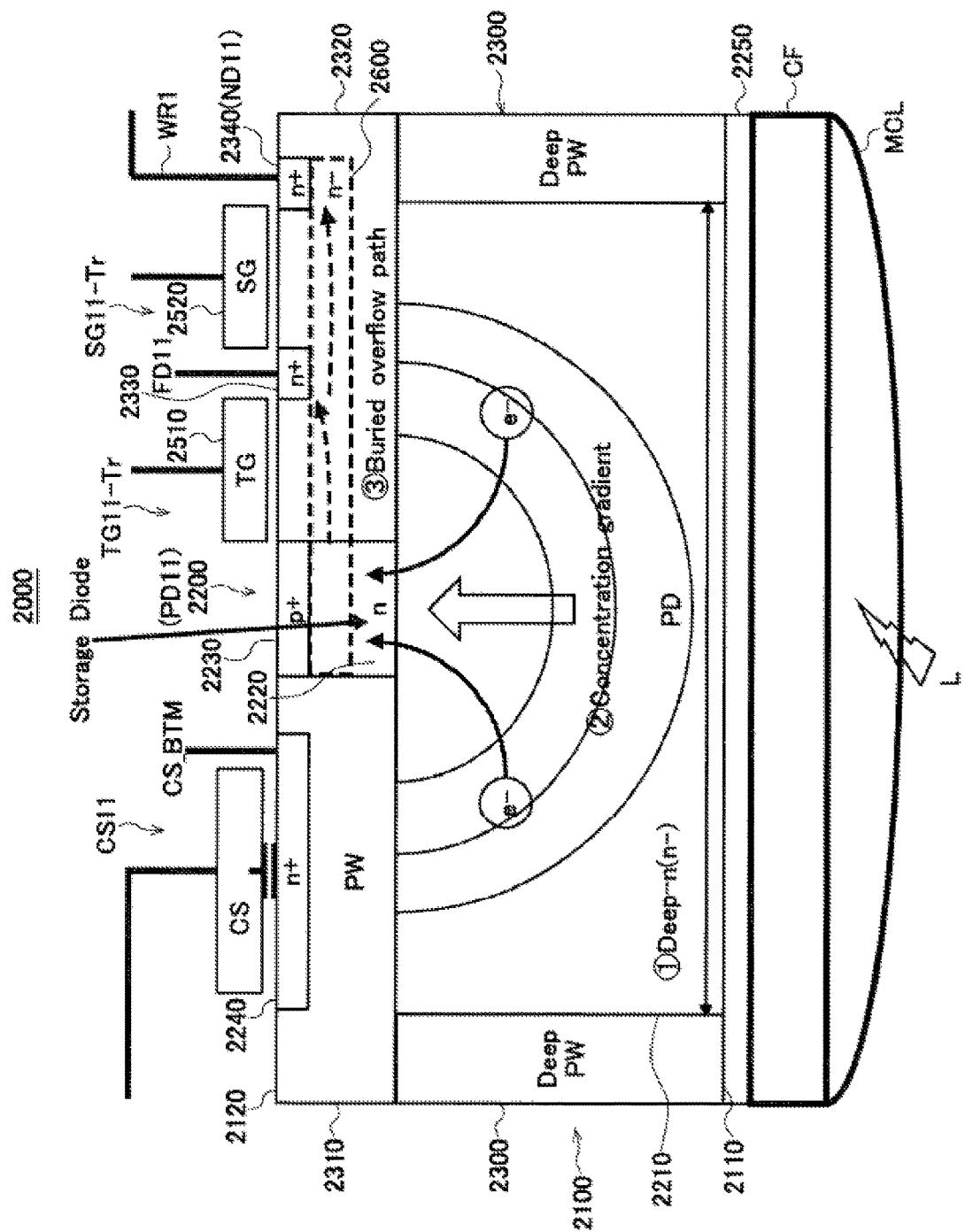
FIG. 7 is a simplified sectional view showing an example configuration of the readable pixel according to the first embodiment of the present invention.

FIG. 7 is a simplified sectional view showing an example configuration of the readable pixel according to the first embodiment of the present invention. The readable pixel described herein includes a pinned photodiode (PPD) and is denoted by the reference sign 2000.

The readable pixel 2000 shown in FIG. 7 includes a semiconductor substrate (hereinafter referred to simply as "the substrate") 2100 having a first substrate surface 2110 (e.g., back surface) to be irradiated with light L and a second substrate surface 2120 (front surface) facing away from the first substrate surface 2110. The readable pixel 2000 includes: a photoelectric conversion part 2200 serving as the photodiode PD11 which includes a first conductivity type (n-type in this embodiment) semiconductor layer (n layer) 2210 buried in the substrate 2100 and is configured to perform photoelectric conversion of received light and store charges; and a second conductivity type (p-type in this embodiment) semiconductor layer 2300 formed at least on a side portion of the n layer (the first conductivity type semiconductor layer) 2210 of the photoelectric conversion part 2200. The n-layer (first conductivity type semiconductor layer) 2210 of the photoelectric conversion part 2200 exhibits a gradient in concentration such that the impurity concentration of the n-type ions gradually increases from the first substrate surface 2110 side to the second substrate surface 2120 side.

Further, the readable pixel 2000 includes: the transfer transistor TG11-Tr that transfers the charges stored in the photoelectric conversion part 2200; the floating diffusion FD11 to which the charges are transferred through the transfer transistor TG11-Tr; the storage transistor SG11-Tr with the source connected to the floating diffusion FD11; and the storage capacitor CS11 serving as the storage capacitance element that stores the charges received from the floating diffusion FD11 via the drain side of the storage transistor SG11-Tr. In the readable pixel 2000, the storage capacitor CS11 serving as a storage capacitance element is formed on the second substrate surface 2120 side so as to spatially overlap with the photoelectric conversion part 2200 in the direction perpendicular to the substrate surface (the direction Z in the orthogonal coordinate system shown).

Further, the photoelectric conversion part 2200 includes a second conductivity type semiconductor region (a p+ region) 2230 formed on the surface of the n layer (the first conductivity type semiconductor layer) 2220 on the second substrate surface 2120 side. The second conductivity type semiconductor region (the p+ region) 2230 contains a higher concentration of impurities than the p layer (the second conductivity type semiconductor layer) 2300 on the side portion of the n layer. The storage capacitor CS11 serving as the storage capacitance element uses, as the first electrode EL1 thereof, the n+ region (the first conductivity type semiconductor region) 2240 formed in the surface of the p layer (the second conductivity type semiconductor layer) 2300 on the second substrate surface 2120 side.

In the first embodiment, the storage capacitor CS11 serving as the storage capacitance element includes the first electrode EL1 and a second electrode EL2. The first electrode EL1 is formed of the n+ region (the first conductivity type semiconductor region) 2240 formed in the surface of the second substrate surface 2120 of the substrate 2100, and the second electrode EL2 is formed above the second substrate surface 2120 so as to be opposed at a distance to the first electrode EL1 in the direction perpendicular to the substrate surface.

In the first embodiment, a flat layer 2250 is formed on the surfaces of the n layer (the first conductivity type semiconductor layer) 2210 of the photoelectric conversion part 2200 and the p layer (the second conductivity type semiconductor layer) 2300 on the first substrate surface 2110 side. A color filter part CF is formed on the light incidence side of the flat layer 2250, and further, a microlens MCL is formed on the light incidence side of the color filter part so as to correspond to the photoelectric conversion part 2200 serving as the photodiode PD11 and the p layer (the second conductivity type semiconductor layer) 2300.

In the first embodiment, the p layer (the first conductivity type semiconductor layer) 2320 in the right region in the drawing of the second substrate surface 2120 of the substrate 2100 contains the transfer transistor TG11-Tr, the floating diffusion FD11, and the storage transistor SG11-Tr.

The floating diffusion FD11 is formed in the surface of the second substrate surface 2120 of the substrate 2100, in the form of an n+ region (the first conductivity type semiconductor region) 2330 containing a higher concentration of impurities than the n layers (the first conductivity type semiconductor layers) 2210 and 2220 of the photoelectric conversion part 2200.

The capacitance connection node ND11 of the storage transistor SG11-Tr for capacitance connection with the storage capacitor CS11 is formed in the surface of the second substrate surface 2120 of the substrate 2100, in the form of an n+ region (the first conductivity type semiconductor region) 2340 containing a higher concentration of impurities than the n layers (the first conductivity type semiconductor layers) 2210 and 2220 of the photoelectric conversion part 2200. The n+ region 2340 serving as the node ND11 is connected to the second electrode EL2 of the storage capacitor CS11 via a wiring layer WR1.

The transfer transistor TG11-Tr includes a gate electrode 2510 disposed above the second substrate surface 2120 of the substrate 2100 between the p+ region (the second conductivity type semiconductor region) 2230 and the n+ region (the first conductivity type semiconductor region) 2330 serving as the floating diffusion FD11.

The storage transistor SG11-Tr includes a gate electrode 2520 disposed above the second substrate surface 2120 of the substrate 2100 between the n+ region (the first conductivity type semiconductor region) 2330 serving as the floating diffusion FD11 and the n+ region (the first conductivity type semiconductor region) 2340 serving as the capacitance connection node ND11.

In the first embodiment, a buried overflow path 2600 is formed and connected to the upper side (the surface facing the p+ layer 2230) of the n layer 2220 of the photoelectric conversion part 2200. The buried overflow path 2600 is configured to transfer the overflow charges from the photoelectric conversion part 2200 to the floating diffusion FD11, further to the capacitive connection node ND11, which is connected to the storage capacitor CS11. The buried overflow path 2600 is formed such that (i) the lower layer of the channel forming region under the gate electrode 2510 of the transfer transistor TG11-Tr, (ii) the lower layer of the n+ region (the first conductivity type semiconductor region) 2330 serving as the floating diffusion FD11, (iii) the lower layer of the channel forming region under the gate electrode 2520 of the storage transistor SG11-Tr, and (iv) the lower layer of the n+ region (the first conductivity type semiconductor region) 2340 serving as the capacitance connection node ND11 are in communication with each other. The buried overflow path 2600 is formed by an n– layer with a low impurity concentration in the n layer 2220 of the photoelectric conversion part 2200.

As described above, in the readable pixel 2000 relating to the first embodiment, the buried overflow path 2600 is formed and connected to the upper side (the surface facing the p+ layer 2230) of the n layer 2220 of the photoelectric conversion part 2200. The buried overflow path 2600 is configured to transfer the overflow charges from the photoelectric conversion part 2200 to the floating diffusion FD11, further to the capacitance connection node ND11, which is connected to the storage capacitor CS11. Therefore, through the entire exposure period, the transfer transistor TG11-Tr remains off (in the non-conduction state), so that dark current is prevented at the silicon interface under the transfer transistor TG11-Tr while the charges can still overflow.

In the readable pixel 2000 of the first embodiment, the storage capacitor CS11 serving as a storage capacitance element faces the second substrate surface 2120 and includes the first electrode EL1 and the second electrode EL2. The first electrode EL1 is formed of the n+ region (the first conductivity type semiconductor region) 2240 formed in the surface of the second substrate surface 2120 of the substrate 2100, and the second electrode EL2 is formed above the second substrate surface 2120 so as to be opposed at a distance to the first electrode EL1 in the direction perpendicular to the substrate surface. The first electrode EL1 and the second electrode EL2 are arranged so as to spatially overlap with the photoelectric conversion part 2200 in the direction perpendicular to the substrate surface (the direction Z in the orthogonal coordinate system shown). An increase in the capacitance of the storage capacitor CS11 may result in a reduced opening of the photodiode PD and thus in a lower sensitivity. The present invention, however, can avoid such drawbacks. The present invention provide for additional advantages. An increase in the light receiving area of the photodiode PD11 may result in reduction of the area occupied by the storage capacitor CS11 and eventually in a reduced dynamic range. The present invention can also prevent this issue. As described above, the first embodiment can implement both a high dynamic range and a high sensitivity without a trade-off.

As described above, in the first embodiment, the PFM mode is selected under a high illuminance condition and in the exposure period PEXP, which starts after the floating diffusion FD11 and the photodiode PD11 serving as the photoelectric conversion element are reset. The PFM mode is followed by the dual sampling read-out mode.

If the dual sampling read-out mode is selected following the PFM mode, the reading part 70 controls the storage transistor SG11-Tr to remain in the non-conduction state, to disconnect the storage capacitor CS11 from the floating diffusion FD11. As a result, the charges in the floating diffusion FD11 are separated from the charges in the storage capacitor CS11, so that the conversion gain is switched to the first conversion gain HCG corresponding to the first capacitance. In a first reset read-out period following the resetting, the reading part 70 performs a first conversion gain reset read-out operation HCGRRD. Specifically, the reading part 70 reads a first read-out reset signal HCGRST (ADC), which is produced through conversion with the first conversion gain corresponding to the first capacitance of the floating diffusion FD11, from the source follower transistor SF11-Tr serving as the output buffer part and processes the first read-out reset signal HCGRST (ADC) in a predetermined manner. The first reset read-out period is followed by a first transfer period and then a first read-out period, in which the reading part 70 further performs a first conversion gain read-out operation HCGSRD. Specifically, the reading part 70 reads a first read-out signal HCGSIG (ADC), which is produced through conversion with the first conversion gain corresponding to the first capacitance of the floating diffusion FD11 from the source follower transistor SF11-Tr serving as the output buffer part and processes the first read-out signal HCGSIG (ADC) in a predeterminer manner.

The reading part 70 either holds the reset level and signal level, or performs a CDS operation based on the difference between the reset level and the signal level. After performing the first conversion gain read-out operation HCGSRD, the reading part 70 then switches the storage transistor SG11-Tr into the conduction state, to connect the storage capacitor CS11 to the floating diffusion FD11. As a result, the charges in the floating diffusion FD11 are combined with the charged in the storage capacitor CS11, so that the conversion gain is switched to the second conversion gain LCG corresponding to the second capacitance. The first read-out period is followed by a second transfer period and then a second read-out period, in which the reading part 70 further performs a second conversion gain read-out operation LCGSRD. Specifically, the reading part 70 reads a second read-out signal LCGSIG (ADC), which is produced through conversion with the second conversion gain corresponding to the second capacitance of the floating diffusion FD11 from the source follower transistor SF11-Tr serving as the output buffer part and processes the second read-out signal LCGSIG (ADC) in a predetermined manner. After the reset transistor RST11-Tr resets the floating diffusion FD11, the reading part 70 performs a second conversion gain reset read-out operation LCGRRD. Specifically, the reading part 70 reads a second read-out reset signal LCGRST (ADC), which is produced through conversion with the second conversion gain LCG corresponding to the second capacitance of the floating diffusion FD11, from the source follower transistor SF11-Tr serving as the output buffer part and processes the second read-out reset signal LCGRST (ADC) in a predetermined manner.

The reading part 70 either holds the reset level and signal level, or performs a DDS operation based on the difference between the reset level and the signal level. In the first embodiment, the reset level of the source follower is obtained after the signal level of the source follower is obtained and by resetting the floating diffusion FD11. Therefore, if a subject has high illuminance, the reset level is an imperfect difference signal (double data sampling (DDS) signal or delta reset sampling (DRS) signal) that has no correlation with reset noise. Such reset noise may stand out in normal CMOS image sensors. According to the read-out scheme of the first embodiment, however, the DDS signal is not used under a low illuminance condition since it is produced under a high illuminance condition and read through the source follower reading. The reset noise thus does not stand out as it is concealed by signal shot noise and thus becomes less invisible.

The reading part 70 can perform the first conversion gain reset read-out operation HCGRRD in the exposure period PEXP. Under a very low illuminance condition, the reading part 70 performs the second conversion gain reset read-out operation LCGRRD and second conversion gain read-out operation LCGSRD, as the normal read-out operation. Under a medium illuminance condition, the reading part 70 performs the first conversion gain reset read-out operation HCGRRD, first conversion gain read-out operation HCGSRD, second conversion gain read-out operation LCGSRD, and second conversion gain reset read-out operation LCGRRD.

As described above, the first embodiment includes the storage transistor SG11-Tr and storage capacitor CS11, so that the capacitance of the floating diffusion FD11 can be switched between the first capacitance and the second capacitance, to change the conversion gain between the first conversion gain corresponding to the first capacitance (for example, high conversion gain: HCG) and the second conversion gain corresponding to the second capacitance (for example, low conversion gain: LCG). With such configurations, the full well capacity (FWC) is small when the conversion gain is set at the high conversion gain (HCG) and large when the conversion gain is set at the low conversion gain (LCG).

The following now describes, as an example, a sequence of operations performed for reading on the pixel circuit in the solid-state imaging device relating to the first embodiment.

Figure 8:
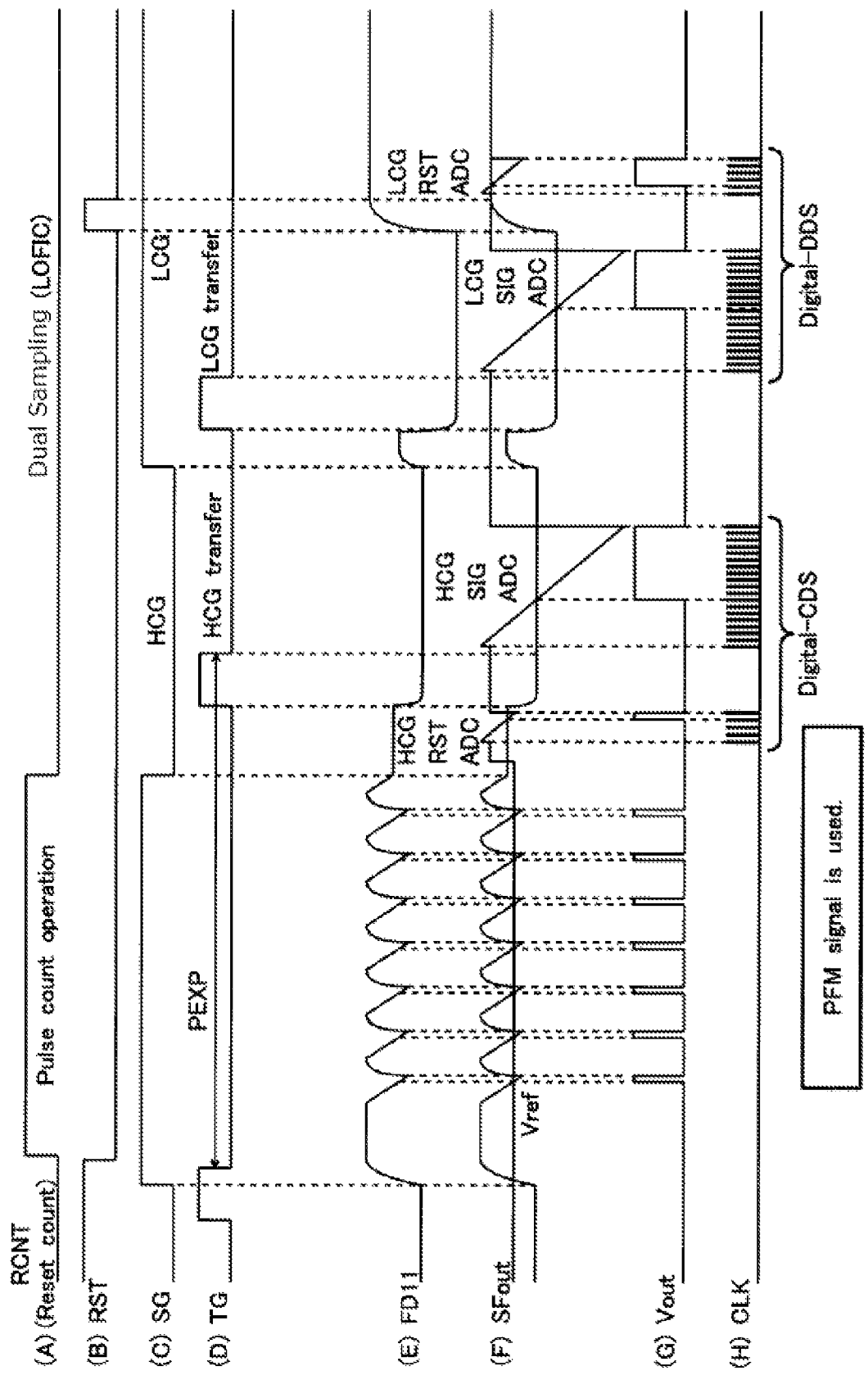
FIG. 8 is a timing chart to illustrate an example sequence of operations for reading performed in a PFM mode and a dual sampling read-out mode on the pixel circuit under a high illuminance condition in the solid-state imaging device relating to the first embodiment of the present invention.
Figure 9:
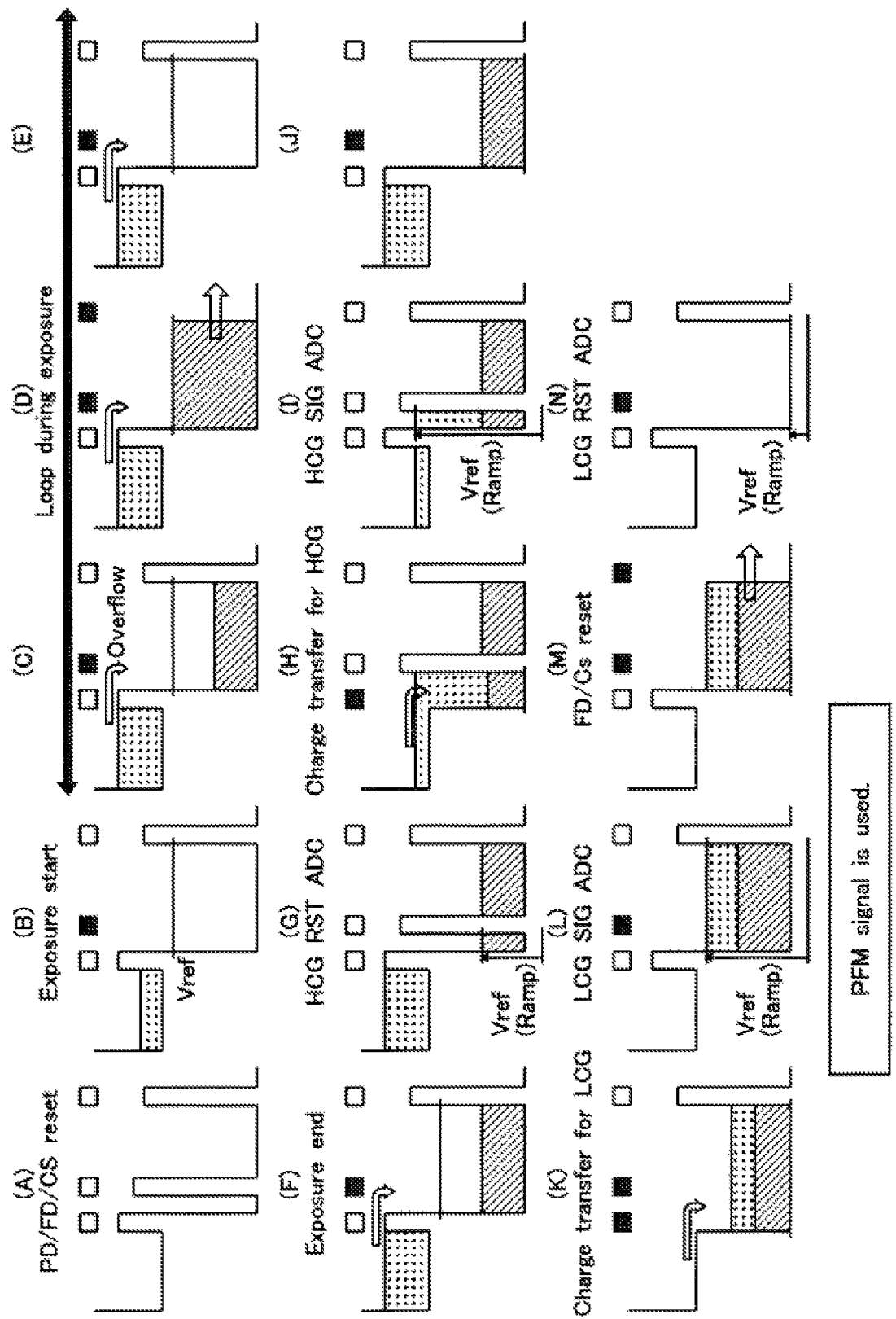
FIG. 9 illustrates a sequence of operations and potential transition to explain the operations performed in the PFM mode and dual sampling read-out mode under a high illuminance condition on the pixel circuit of the solid-state imaging device relating to the first embodiment of the present invention.
Figure 10:
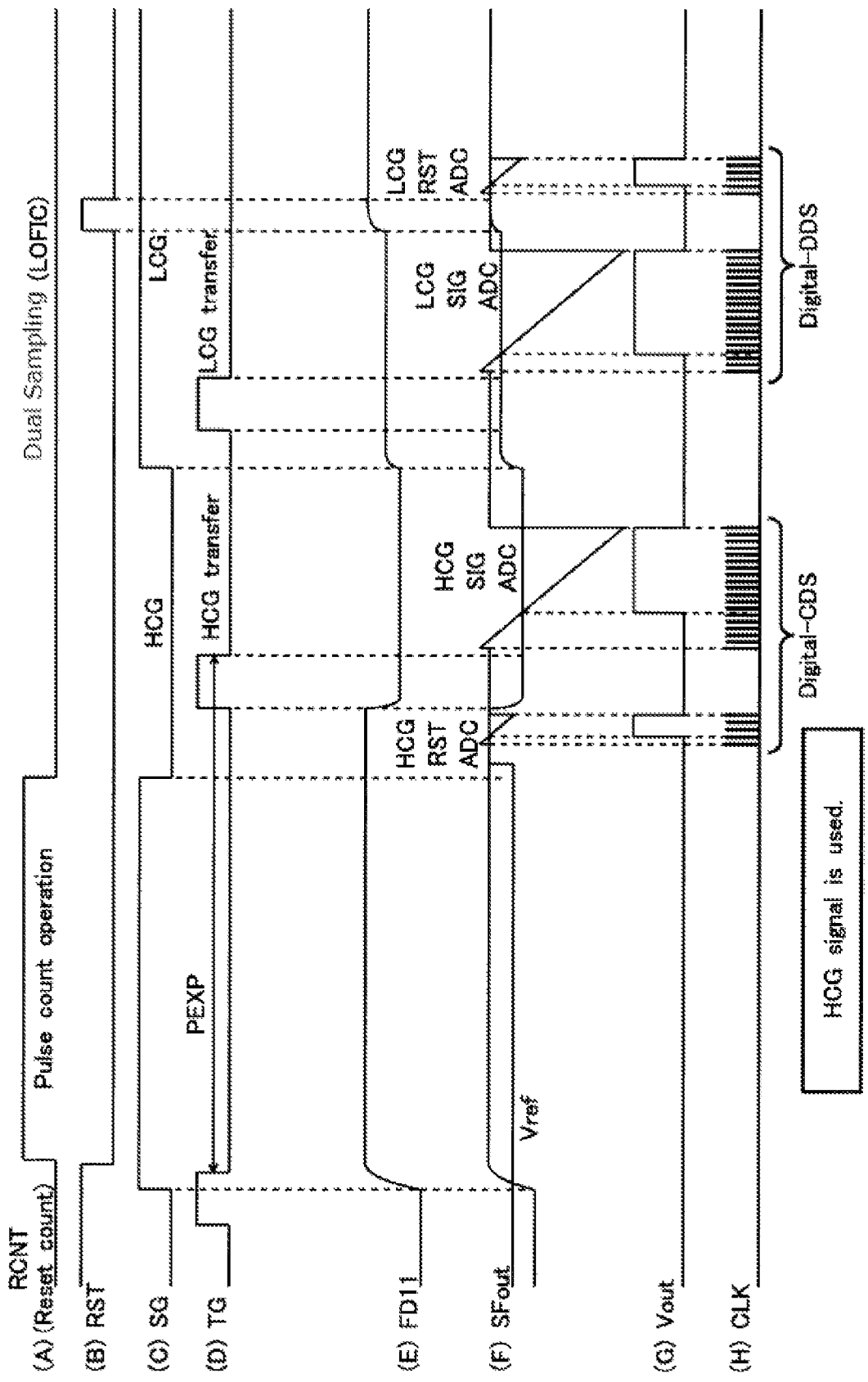
FIG. 10 is a timing chart to illustrate an example sequence of operations for reading performed in the PFM mode and dual sampling read-out mode on the pixel circuit under a low illuminance condition in the solid-state imaging device relating to the first embodiment of the present invention.
Figure 11:
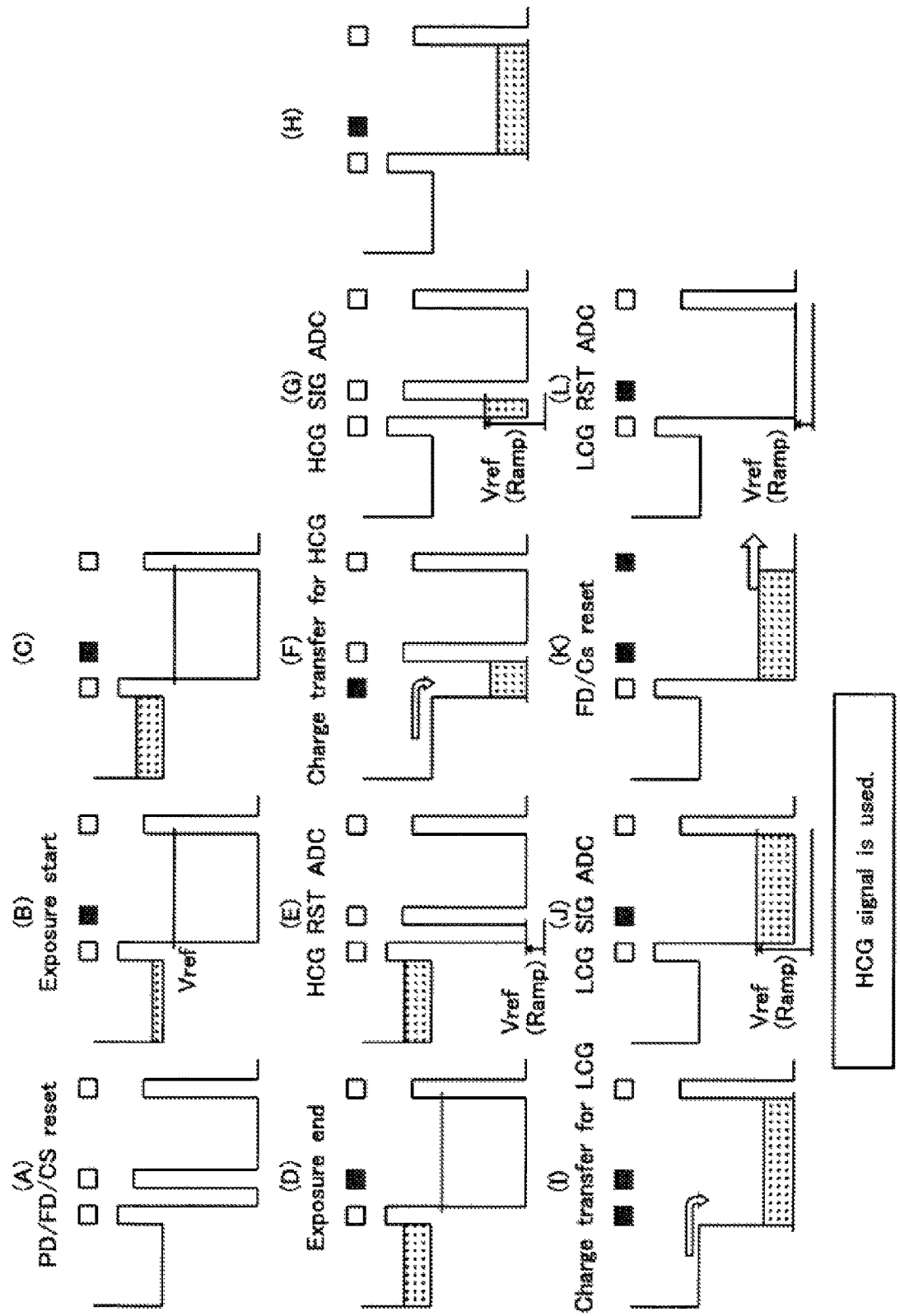
FIG. 11 illustrates a sequence of operations and potential transition to explain the operations performed in the PFM mode and dual sampling read-out mode under a low illuminance condition on the pixel circuit of the solid-state imaging device relating to the first embodiment of the present invention.

FIG. 8 is a timing chart including waveforms (A) to (H) to illustrate an example sequence of operations for reading performed in the PFM mode and dual sampling read-out mode on the pixel circuit under a high luminance condition in the solid-state imaging device relating to the first embodiment of the present invention. FIG. 9 includes views (A) to (N) to illustrate a sequence of operations and potential transition to explain the operations performed in the PFM mode and dual sampling read-out mode under a high illuminance condition on the pixel circuit of the solid-state imaging device relating to the first embodiment of the present invention. FIG. 10 is a timing chart including waveforms (A) to (H) to illustrate an example sequence of operations for reading performed in a PFM mode and a dual sampling read-out mode on the pixel circuit under a low illuminance condition in the solid-state imaging device relating to the first embodiment of the present invention. FIG. 11 includes views (A) to (N) to illustrate a sequence of operations and potential transition to explain the operations performed in a PFM mode and a dual sampling read-out mode under a low illuminance condition on the pixel circuit of the solid-state imaging device relating to the first embodiment of the present invention.

In FIGS. 8 and 10, the waveform (A) shows the reset count signal RCNT in synchronization with the mode selection signal SMS and indicating the PFM mode period or dual sampling read-out mode period, the waveform (B) shows the control signal RST for the reset transistor RST11-Tr, the waveform (C) shows the control signal SG for the storage transistor SG11-Tr, the waveform (D) shows the control signal TG for the transfer transistor TG11-Tr, the waveform (E) shows the potential of the floating diffusion FD11, the waveform (F) shows the output voltage SFout from the source follower transistor SF11-Tr and the reference signal Vref (1, 2) for the comparator 220, the waveform (G) shows the digital output voltage Vout from the comparator 220, and the waveform (H) shows the clock signal CLK used in the dual sampling read-out mode.

<Operations Performed Under High Illuminance Condition>

Under a high illuminance condition, prior to the PFM mode, the control signal RST is set at the high level to control the reset transistor RST11-Tr to remain in the conduction state. After this, the control signal TG is set at the high level to control the transfer transistor TG11-Tr to remain in the conduction state, so that the floating diffusion FD11 is connected to the photodiode PD11. The control signal SG is then switched from the low level to the high level, to switch the storage transistor SG11-Tr from the non-conduction state to the conduction state. This resets the photodiode PD11 and floating diffusion FD11 to the fixed potential VAAPIX. Stated differently, global resetting is performed (see the view (A) in FIG. 9). The control signal TG is then switched from the high level to the low level to switch the transfer transistor TG11-Tr from the conduction state to the non-conduction state.

At the time when the transfer transistor TG11-Tr is switched from the conduction state to the non-conduction state, the exposure period PEXP starts (the view (B) in FIG. 9). After the exposure period PEXP starts, the control signal RST is switched from the high level to the low level to switch the reset transistor RST11-Tr from the conduction state into the non-conduction state, the reset count signal RCNT in synchronization with the mode selection signal SMS activates the PFM mode.

In the PFM mode under a high illuminance condition, if the voltage signal corresponding to the charges held in the floating diffusion FD11 reaches the reference signal Vref11, the comparison result signal Vout from the comparator 220 is applied to perform feedback resetting FRST11 to control the reset transistor RST12-Tr to remain in the conduction state for a predetermined period of time, so that the floating diffusion FD11 is self-reset (see the views (C), (D) and (E) in FIG. 9). The number of times the floating diffusion FD11 is reset (the reset frequency of the floating diffusion FD11) is counted by the selector counter circuit 230 in response to the comparison result signal Vout from the comparator 220. In the PFM mode under a high illuminance condition, in the exposure period PEXP, overflowing of the charges from the photodiode PD11 to the floating diffusion FD11, self-resetting of the floating diffusion FD11 resulting from the feedback resetting through the comparison result signal Vout from the comparator 220, and counting of the number of times the floating diffusion FD11 is reset (the reset frequency of the floating diffusion FD11) by the selector counter circuit 230 are performed repeatedly (see the views (C), (D) and (E) in FIG. 9).

To end the PFM mode and start the dual sampling (LOFIC) read-out mode, the reset count signal RCNT in synchronization with the mode selection signal SMS is switched from the high level to the low level. In parallel, the control signal SG is switched from the high level to the low level to place the storage transistor SG11-Tr into the non-conduction state, so that the storage capacitor CS11 is disconnected from the floating diffusion FD11.

As a result, the charges in the floating diffusion FD11 and the charges in the storage capacitor CS11 are separated, so that the gain of the floating diffusion FD11 is switched to the first conversion gain HCG corresponding to the first capacitance.

In the first reset read-out period following the resetting, the first conversion gain reset read-out operation HCGRRD is performed. Specifically, the first read-out reset signal HCGRST (ADC), which is produced through conversion with the first conversion gain HCG corresponding to the first capacitance of the floating diffusion FD11, is read from the source follower transistor SF11-Tr (see the view (G) in FIG. 9) and processed in a predetermined manner. The first reset read-out period is followed by the first transfer period, in which the control signal TG is switched to the high level to keep the transfer transistor TG11-Tr in the conduction state, so that the charges stored in the photodiode PD11 are transferred to the floating diffusion FD11. After the first transfer period, the control signal TG is switched to the low level to switch the transfer transistor TG11-Tr into the non-conduction state.

The first transfer period is followed by the first read-out period, in which the first conversion gain read-out operation HCGSRD is performed. Specifically, the first read-out signal HCGSIG (ADC), which is produced through conversion with the first conversion gain corresponding to the first capacitance of the floating diffusion FD11, is read from the source follower transistor SF11-Tr and processed in a predetermined manner.

The reset level HCGRSTADC and the signal level HCGSIGADC are held, or a CDS operation is performed based on the difference between the reset level and the signal level.

After the first conversion gain read-out operation HCGSRD, the control signal SG is switched from the low level to the high level to place the storage transistor SG11-Tr into the conduction state, so that the storage capacitor CS11 is connected to the floating diffusion FD11. As a result, the charges in the floating diffusion FD11 and the charges in the storage capacitor CS11 are combined, so that the gain of the floating diffusion FD11 is switched to the second conversion gain LCG corresponding to the second capacitance.

The second read-out period is followed by the second transfer period, in which the control signal TG is switched to the high level to keep the transfer transistor TG11-Tr in the conduction state, so that the charges stored in the photodiode PD11 are transferred to the floating diffusion FD11. After the second transfer period, the control signal TG is switched to the low level to switch the transfer transistor TG11-Tr into the non-conduction state. The second read-out period is followed by the second transfer period and then the second read-out period, in which the second conversion gain read-out operation LCGSRD is performed. Specifically, the second read-out signal LCGSIG (ADC), which is produced through conversion with the second conversion gain LCG corresponding to the second capacitance of the floating diffusion FD11, is read from the source follower transistor SF11-Tr (see the view (L) in FIG. 9) and processed in a predetermined manner.

The second transfer period is followed by the second reset read-out period, in which the second conversion gain reset read-out operation LCGRRD is performed. Specifically, the second read-out reset signal LCGRST (ADC), which is produced through conversion with the second conversion gain LCG corresponding to the second capacitance of the floating diffusion FD11, is read from the source follower transistor SF11-Tr and processed in a predetermined manner.

The reset level LCGRSTADC and the signal level LCGSIGADC are held, or a DDS operation is performed based on the difference between the reset level LCGRSTADC and the signal level LCGSIGADC.

<Operations Performed under Low Illuminance Condition>

Under a low illuminance condition, the reference signal Vref11 corresponding to the charges held in the floating diffusion FD11 is never reached in the PFM mode the voltage signal corresponding to the charges held in the floating diffusion FD11 never reaches the reference signal Vref11 in the PFM mode. Therefore, in the PFM mode under a low illuminance condition, in the exposure period PEXP, overflowing of the charges from the photodiode PD11 to the floating diffusion FD11, self-resetting of the floating diffusion FD11 resulting from the feedback resetting through the comparison result signal Vout from the comparator 220, and counting of the number of times the floating diffusion FD11 is reset (the reset frequency of the floating diffusion FD11) by the selector counter circuit 230 are never performed repeatedly.

The series of operations performed in the dual sampling (LOFIC) read-out mode under a low illuminance condition are the same as those performed under a high illuminance condition, which have been described in the above. They are thus not described in detail here.

As described above, the pixel circuit 200 relating to the first embodiment includes: the readable pixel 210 for performing photoelectric conversion at the photodiode PD11 serving as the photoelectric conversion element and producing a readable signal corresponding to an illuminance condition of incident light; the comparator 220 for comparing the voltage signal SFout read from the readable pixel 210 against the reference signal Vref and outputting the comparison result signal Vout corresponding to the result of the comparison; the selector counter circuit 230 for selecting the count clock for the counter in response to the comparison result signal Vout from the comparator 220 and performing counting in synchronization with the selected clock; and the memory circuit 240 for storing digital data produced by the selector counter circuit 230 based on the comparison result signal Vout from the comparator 220. The pixel circuit 200 includes the overflow path 2600 for allowing the charges overflowing from the photodiode PD11 to overflow to the floating diffusion FD11, further to the connection node connected to the storage capacitor CS11. The readable pixel 210, comparator 220 and selector counter circuit 230 operate in the pulse frequency modulation (PFM) mode under a high illuminance condition and in the dual sampling read-out (for example, LOFIC) mode under a low illuminance condition using the charges stored in the photoelectric conversion element and the overflow charges. Specifically, under a high illuminance condition or in the PFM mode, if the voltage signal corresponding to the charges held in the floating diffusion FD11 reaches the full well voltage of the photodiode PD11 serving as the photoelectric conversion element, the comparison result signal Vout from the comparator 220 is applied to perform the feedback resetting FRST11 to allow the floating diffusion FD11 to perform self-resetting. The selector counter circuit 230 counts the number of times the floating diffusion FD11 is reset (the reset frequency of the floating diffusion FD11) in response to the comparison result signal Vout from the comparator 220. Under a low illuminance condition, the dual sampling read-out mode (LOFIC) mode is selected that uses the dual gain scheme based on the charges stored in the photodiode PD11 serving as the photoelectric conversion element and the overflow charges.

Since the buried overflow path extends at least from the photodiode PD11 to the region where the floating diffusion FD11 is formed in the first embodiment, the transfer transistor TG11-Tr remains turned-off (in the non-conduction state) through the entire exposure period to allow the charges to overflow while dark current is prevented at the silicon interface under the transfer transistor TG11-Tr. Stated differently, low signals can be read even while the saturation is reached without compromising the sensitivity and full well in the first embodiment. In addition, the first embodiment can achieve reduced pixel size.

Figure 12:
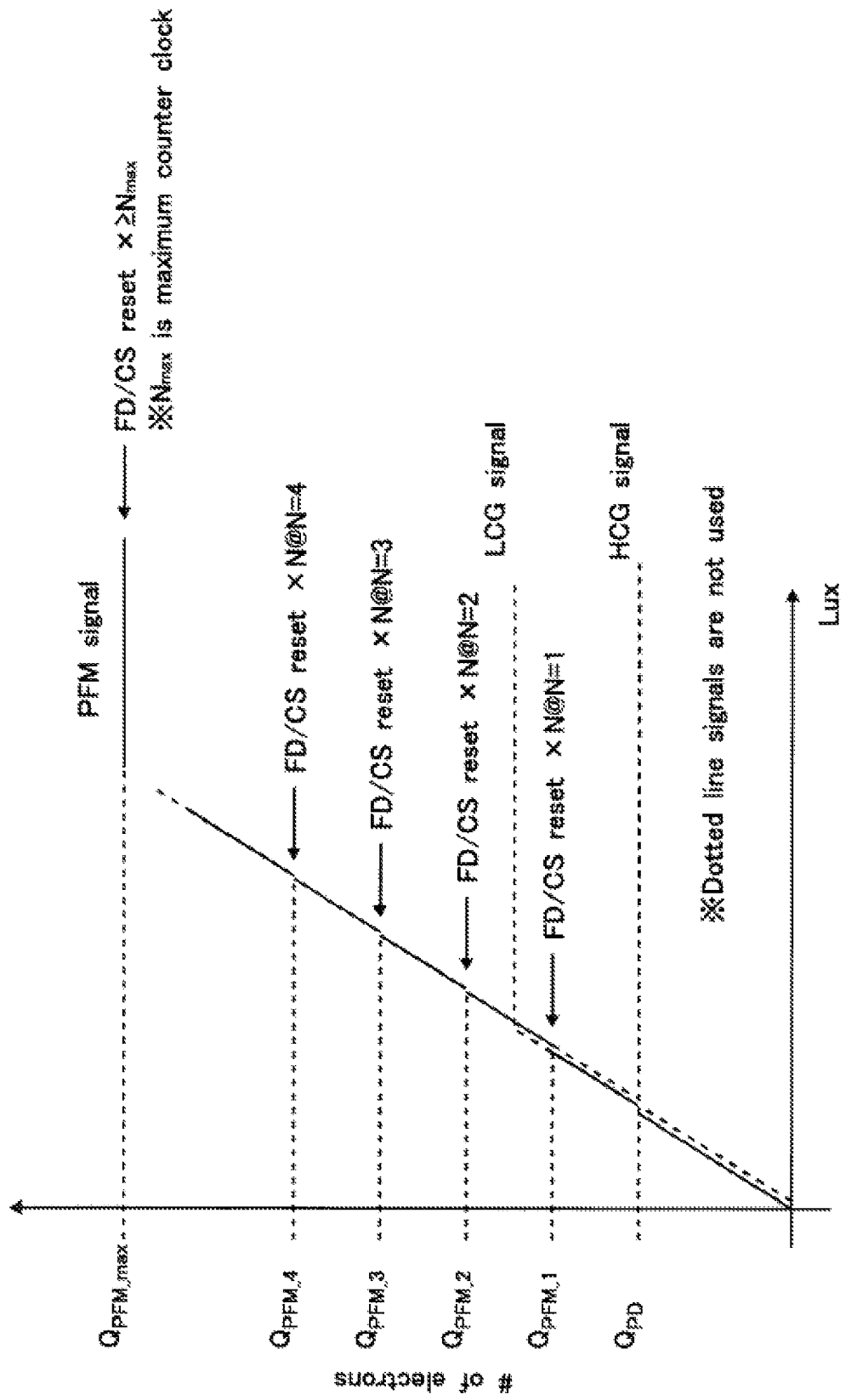
FIG. 12 shows linearity exhibited by a combination signal of read-out signals in the dual sampling read-out mode in the solid-state imaging device relating to the first embodiment of the present invention.

The first embodiment can also provide for enhanced dynamic range by performing reading in a predetermined mode, while accomplishing a small pixel size. The first embodiment is capable of substantially achieving an increased dynamic range and a raised frame rate. The first embodiment produces further effects. Very-high-dynamicrange signals can be read with a linear response in the PFM read-out mode as shown in FIG. 12, and high-sensitivity/low-noise signals can be read in the HCG read-out mode. The first embodiment can prevent the uneven full well capacities from being translated into uneven signals at the combining point between the pixels. In the first embodiment, the number of times the floating diffusion FD11 is reset is counted to obtain the amount of actually generated charges. If pulse light or other sorts of abnormal light is incident on a solid-state imaging device during an exposure period, the solid-state imaging device may produce erroneously detected signals. The present embodiment can avoid such errors.

Second Embodiment

Figure 13:
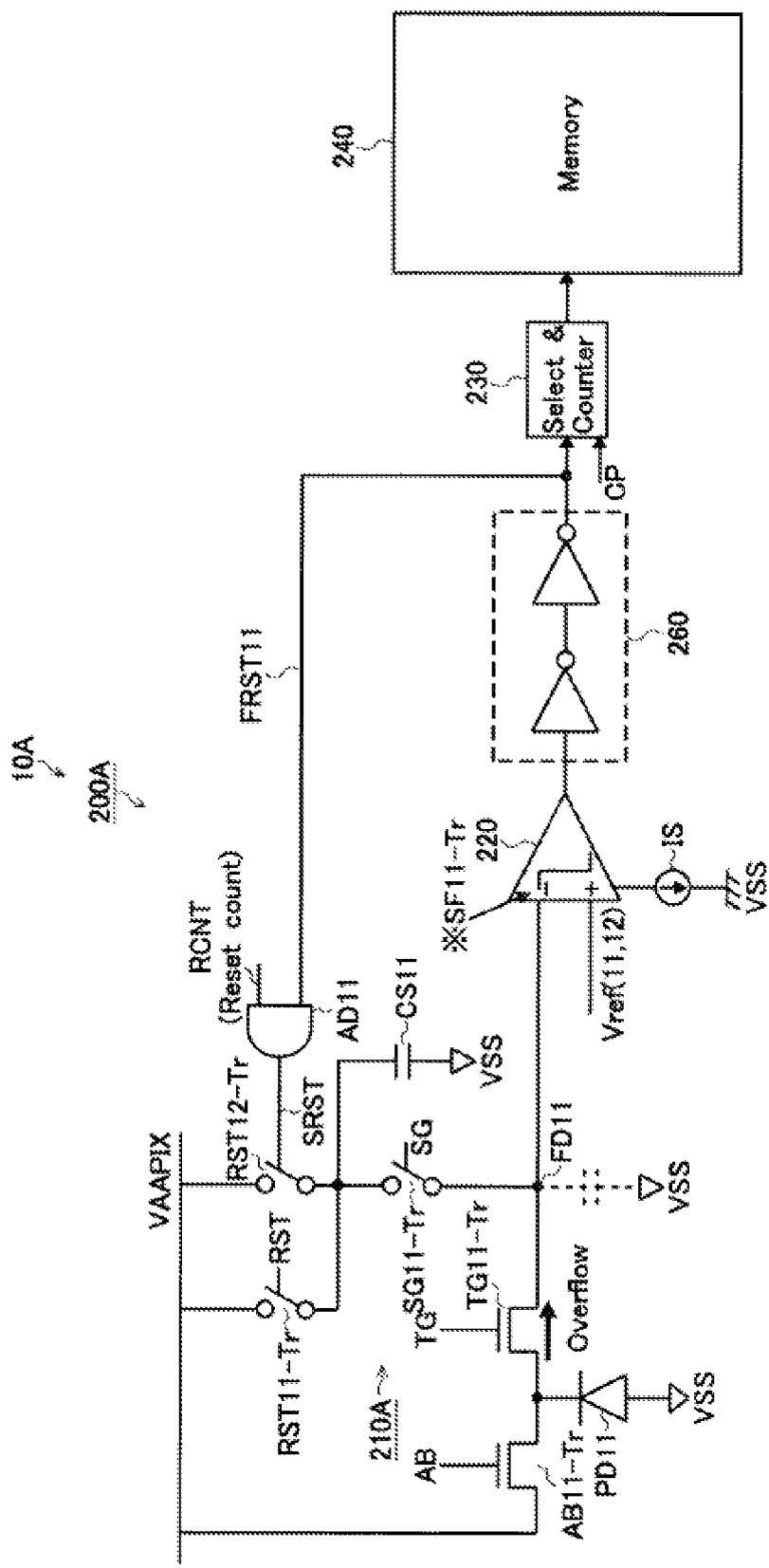
FIG. 13 is a circuit diagram showing an example configuration of a readable pixel of a pixel circuit relating to a second embodiment of the present invention.
Figure 14:
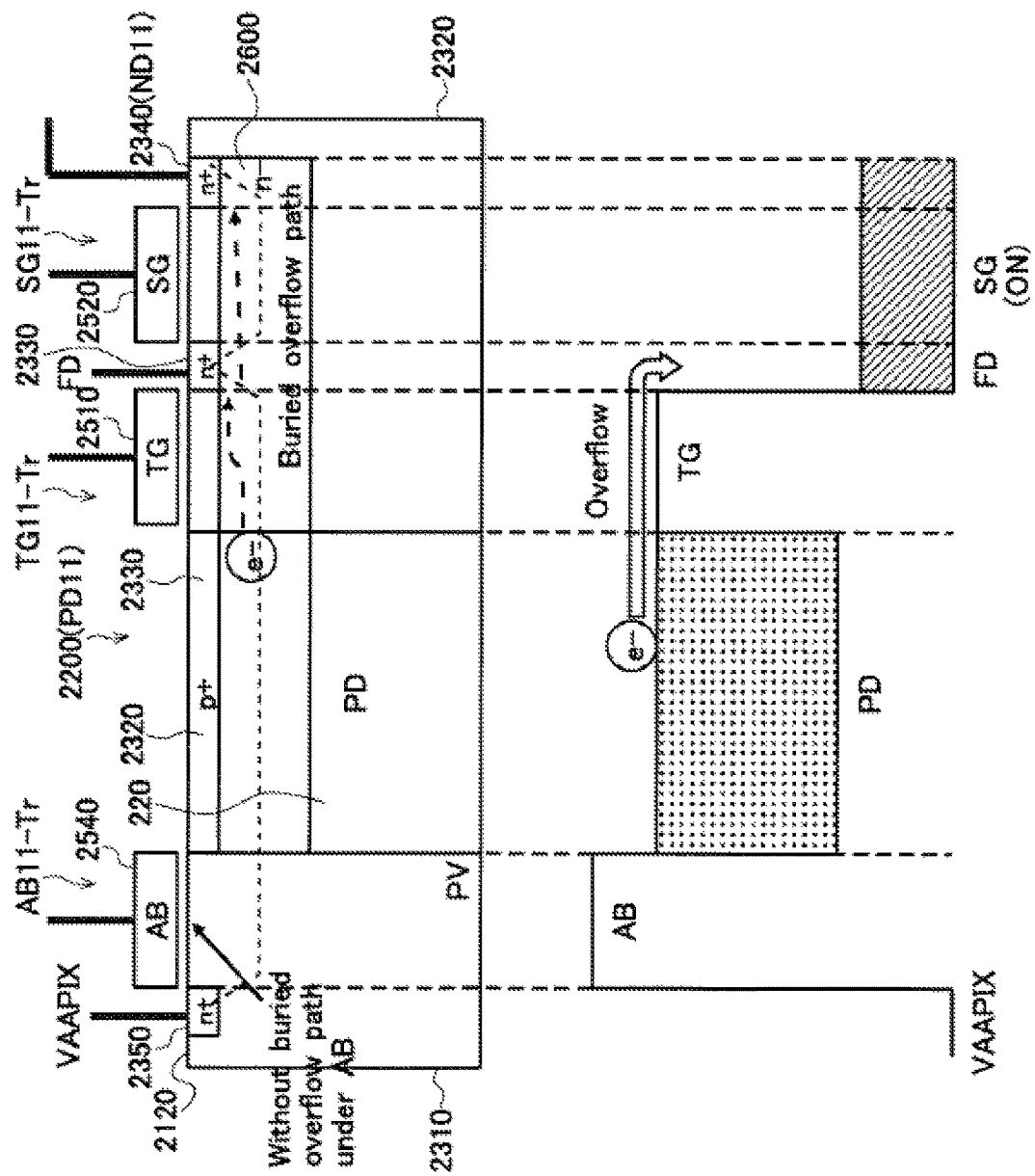
FIG. 14 is a simplified sectional view showing an example configuration of a charge integrating and transferring system including a shutter gate transistor, or the main part of the pixel circuit relating to the second embodiment of the present invention.
Figure 15:
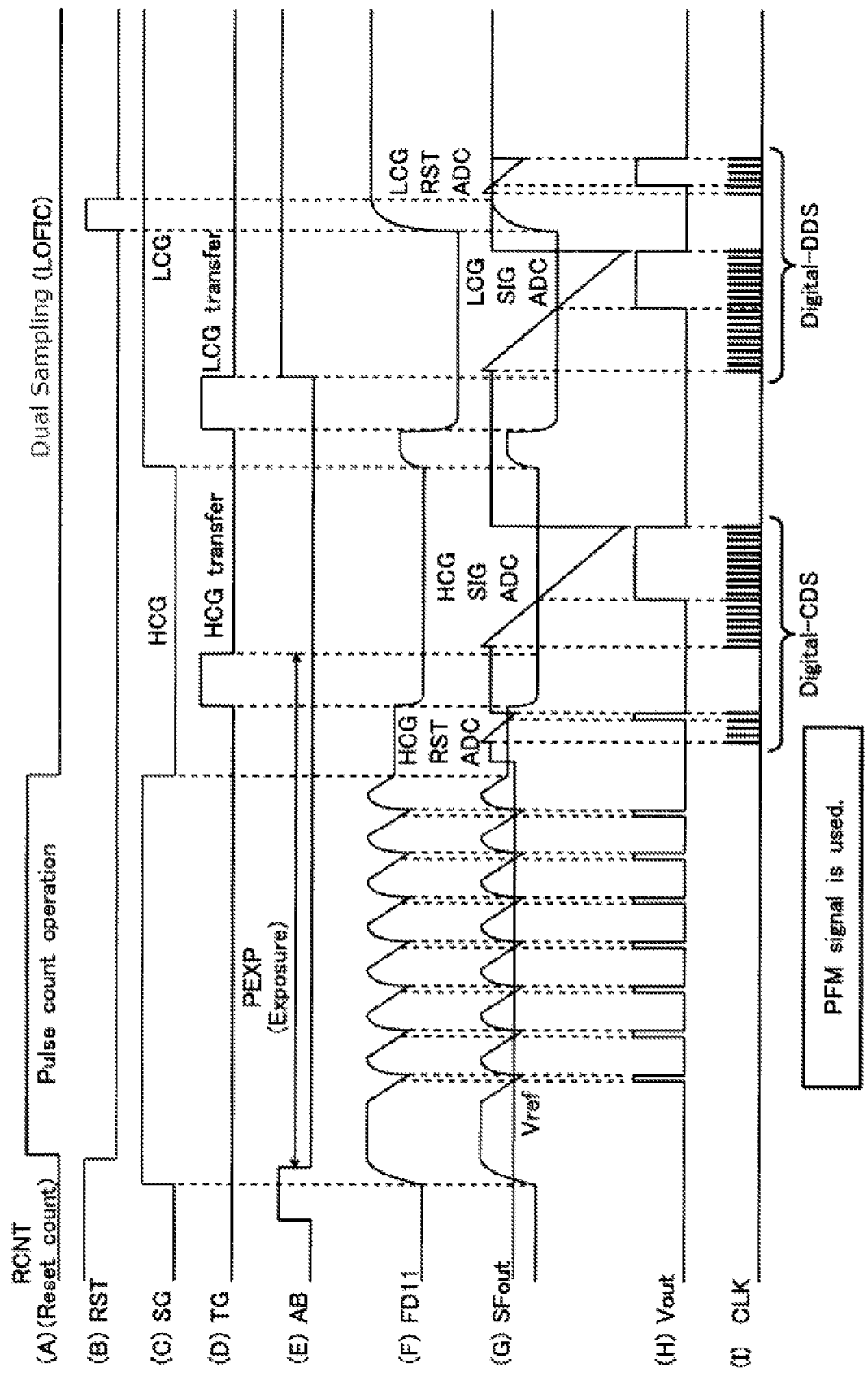
FIG. 15 is a timing chart to illustrate an example sequence of operations for reading performed in the PFM mode and dual sampling read-out mode on the pixel circuit under a high luminance condition in the solid-state imaging device relating to the second embodiment of the present invention.
Figure 16:
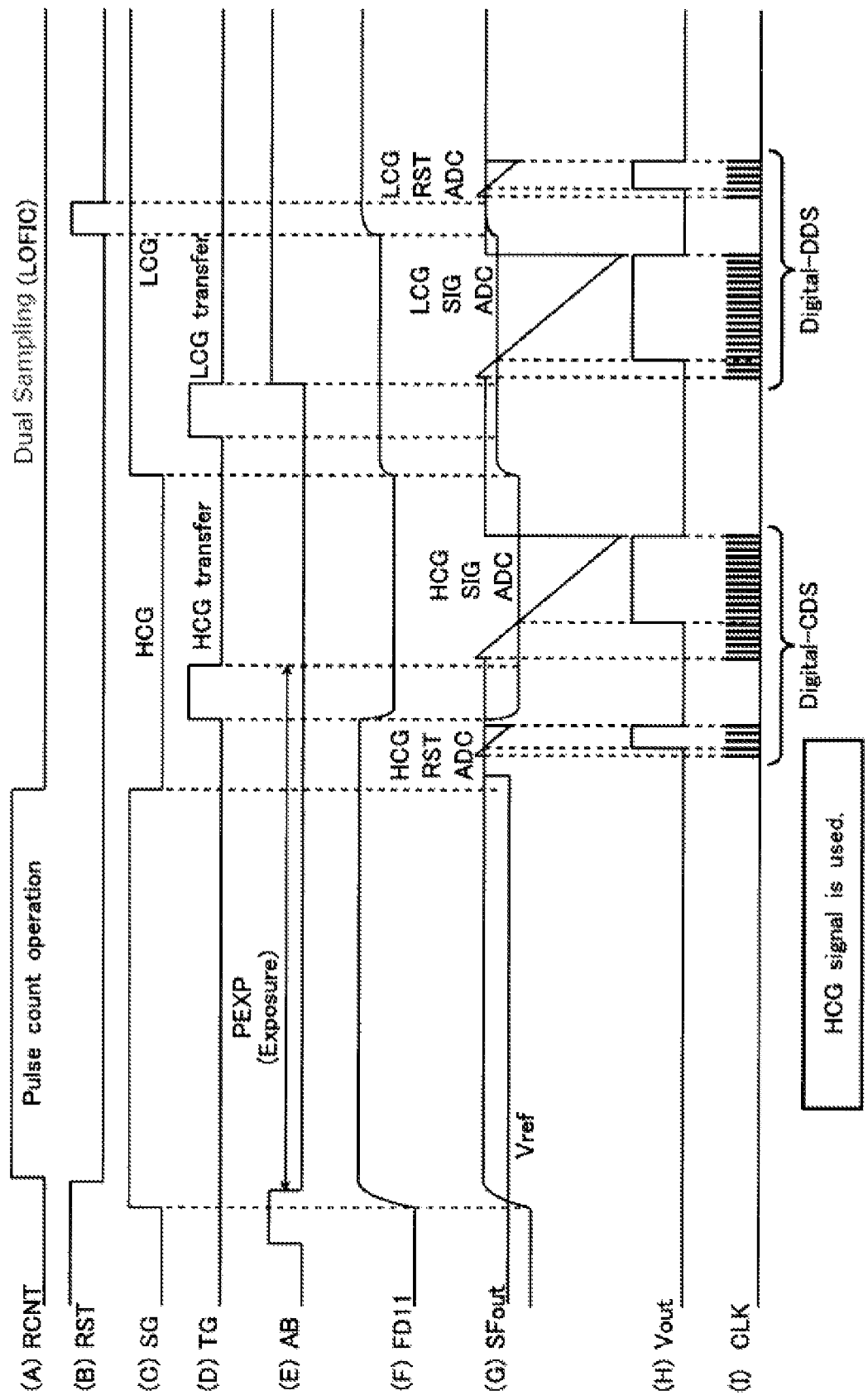
FIG. 16 is a timing chart to illustrate an example sequence of operations for reading performed in the PFM mode and dual sampling read-out mode on the pixel circuit under a low illuminance condition in the solid-state imaging device relating to the second embodiment of the present invention.

FIG. 13 is a circuit diagram showing an example configuration of a readable pixel of a pixel circuit relating to a second embodiment of the present invention. FIG. 14 is a simplified sectional view showing an example configuration of a charge integrating and transferring system including a shutter gate transistor, or the main part of the pixel circuit relating to the second embodiment of the present invention. FIG. 15 is a timing chart including waveforms (A) to (H) to illustrate an example sequence of operations performed for reading in the PF mode and dual sampling read-out mode on the pixel circuit under a high luminance condition in the solid-state imaging device relating to the second embodiment of the present invention. FIG. 16 is a timing chart including waveforms (A) to (I) to illustrate an example sequence of operations performed for reading in the PFM mode and dual sampling read-out mode on the pixel circuit under a low illuminance condition in the solid-state imaging device relating to the second embodiment of the present invention.

The pixel circuit 200A of the solid-state imaging device 10A relating to the second embodiment differs from the pixel circuit 200 of the solid-state imaging device 10 relating to the above-described first embodiment in the following points.

The pixel circuit 200A of the solid-state imaging device 10A of the second embodiment includes an anti-blooming transistor AB11-Tr serving as a gate element connected between the charge storage region in the photodiode PD11 and a fixed potential (for example, power supply potential) VAAPIX. The anti-blooming transistor AB11-Tr is configured to discharge the charges in the photodiode PD11 to the fixed potential VAAPIX located outside the region of the floating diffusion FD11.

In the solid-state imaging device 10A relating to the second embodiment, the overflow path 2600 is buried as shown in FIG. 14 (and FIG. 7). Therefore, the overflow barrier of the transfer transistor TG11-Tr is lower than the overflow barrier of the anti-blooming transistor AB11-Tr. This causes the charges in the photodiode PD11 to overflow only toward the floating diffusion FD11.

<Configuration of Left Separation Layer 2310 in X direction (Column Direction)>

An n+ layer 2350 serving as the drain of the anti-blooming transistor AB11-Tr is formed on the p-type separation layer 2310, which is arranged on the left side in the X direction (column direction) in FIG. 14, on the second substrate surface 2120 side. On the second substrate surface 2120, a gate electrode 2540 of the anti-blooming transistor AB11-Tr is formed with a gate insulator sandwiched therebetween. Under the transfer transistor TG11-Tr, the overflow path 2600 extends from the photodiode PD11 to the floating diffusion FD11, finally to the connection node 2340 connected to the storage capacitor CS11. The potential of the overflow path 2600 can be controlled through gate control, for example.

With the above-described structure, if the intensity of the incident light is very high (the amount of the incident light is very large), the charges above the well capacity of the PD overflow into the floating diffusion FD11 as overflow charges through the overflow path 2600 under the transfer transistor TG11-Tr.

In the solid-state imaging device 10A relating to the second embodiment, the charges stored in the photodiode PD11 are reset by controlling the anti-blooming transistor AB11-Tr to remain in the conduction state for a predetermined period of time, as shown in the waveform (E) in FIGS. 15 and 16. The exposure period PEXP starts when the control signal AB for the anti-blooming transistor AB11-Tr is switched from the high level to the low level.

In other respects, the second embodiment is the same as the first embodiment described above. The second embodiment can not only produce the same effects as the above-described first embodiment but also produce the following effects.

The second embodiment can prevent mixing of charges (which can result in false signals), which is caused by the signals indicative of the charges exceeding the charges that can be stored on a given photodiode PD (overflow charges) flowing into adjacent pixels.

Third Embodiment

Figure 17:
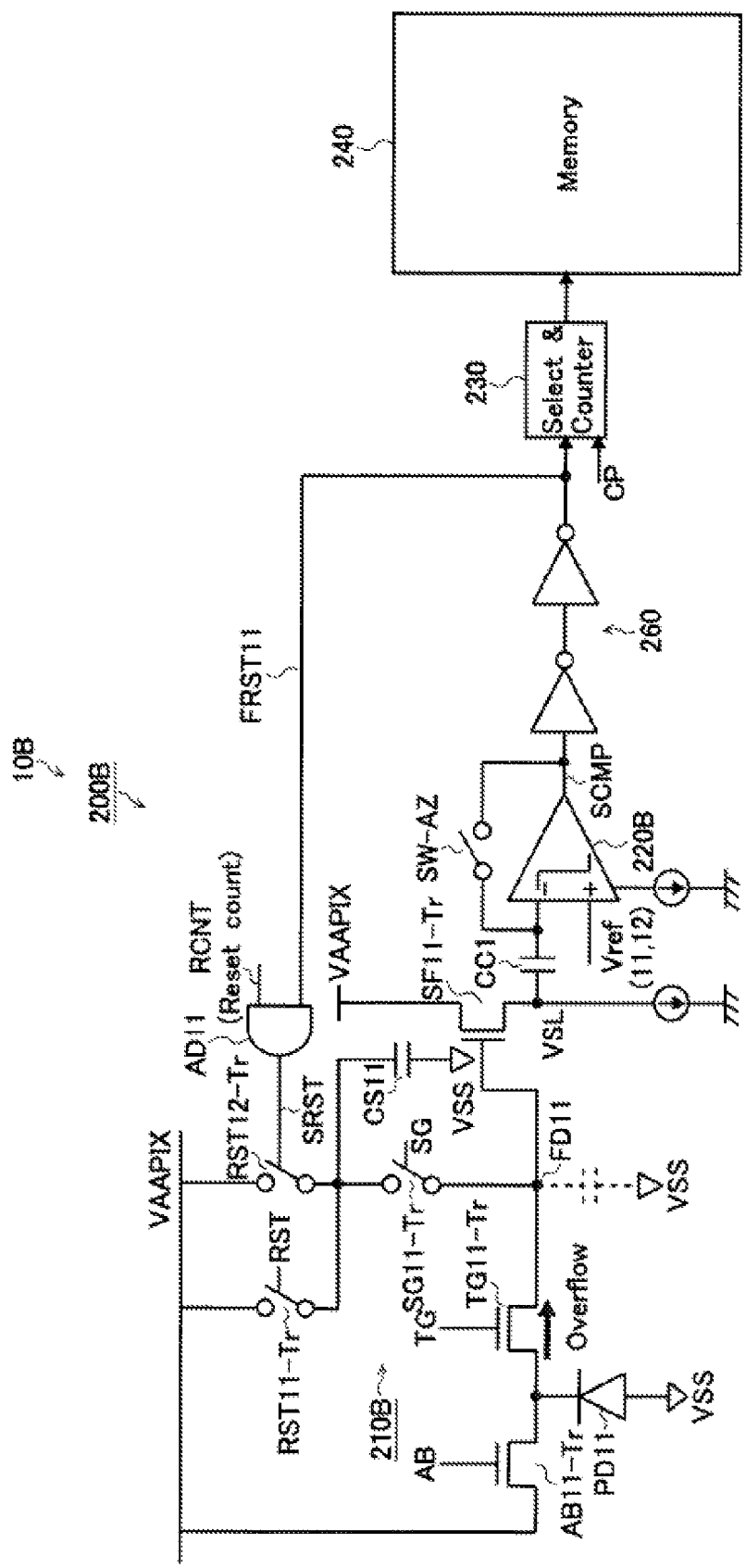
FIG. 17 is a circuit diagram showing an example configuration of a pixel circuit according to a third embodiment of the present invention.

FIG. 17 is a circuit diagram showing an example configuration of a pixel circuit of a solid-state imaging device 10B relating to a third embodiment of the present invention.

The pixel circuit 200B of the solid-state imaging device 10B relating to the third embodiment differs from the pixel circuit 200A of the solid-state imaging device 10A relating to the above-described second embodiment in terms of the configuration of a comparator 220B.

In the pixel circuit 200B of the solid-state imaging device 10B relating to the third embodiment, a first input terminal or inversion input terminal (−) of the comparator 220B receives the voltage signal VSL fed thereto, which is output from the output node of the readable pixel 210B connected to the source side of the source follower transistor SF11-Tr, and a second input terminal or non-inversion input terminal (+) of the comparator 220B receives the reference signal (referential voltage) Vref (11, 12) fed thereto. The comparator 220B performs AD conversion (a comparing operation) of comparing the voltage signal VST against the reference signal Vref and outputting a digital comparison result signal SCMP.

The first input terminal or inversion input terminal (−) of the comparator 220B is connected to a coupling capacitor CC1. In this way, the output node of the source follower transistor SF11-Tr serving as the output buffer part of the readable pixel 210B formed on a first substrate is AC coupled to the input part of the comparator 220B formed on a second substrate, so that the noise can be reduced and high SNR can be achieved when the illuminance is low.

In the comparator 220B, an auto-zero switch SW-AZ serving as a reset switch is connected between the output terminal and the first input terminal or inversion input terminal (−). This can eliminate the offset at the comparator 220B.

The comparator 220B compares the analog signal (the potential VSL) read from the source follower transistor SF11-Tr serving as the output buffer part of the readable pixel 210B against the reference signal Vref12, for example, the ramp signal RAMP that linearly changes with a certain gradient or has a slope waveform. During the comparison, a counter (not shown), which is provided for each column as is the comparator 220B, is operating. The ramp signal RAMP having a ramp waveform and the value of the counter vary in a one-to-one correspondence, so that the voltage signal VSL is converted into a digital signal. Basically, the AD converting part converts a change in voltage, in other words, a change in the reference signal Vref (for example, the ramp signal RAMP) into a change in time, and counts the change in time at certain intervals (with certain clocks). In this way, the AD converting part obtains a digital value. When the analog signal VSL and the ramp signal RAMP (the reference signal Vref) cross each other, the output from the comparator 220B is inverted, the clock input into the counter is stopped or the suspended clock is input into the counter, and the value (data) of the counter at that timing is saved in the memory part 240. In this way, the AD conversion is completed.

As described above, the third embodiment can eliminate the offset at the comparator 220B and also achieve reduced noise and high SNR under a low illuminance condition.

Fourth Embodiment

Figure 18:
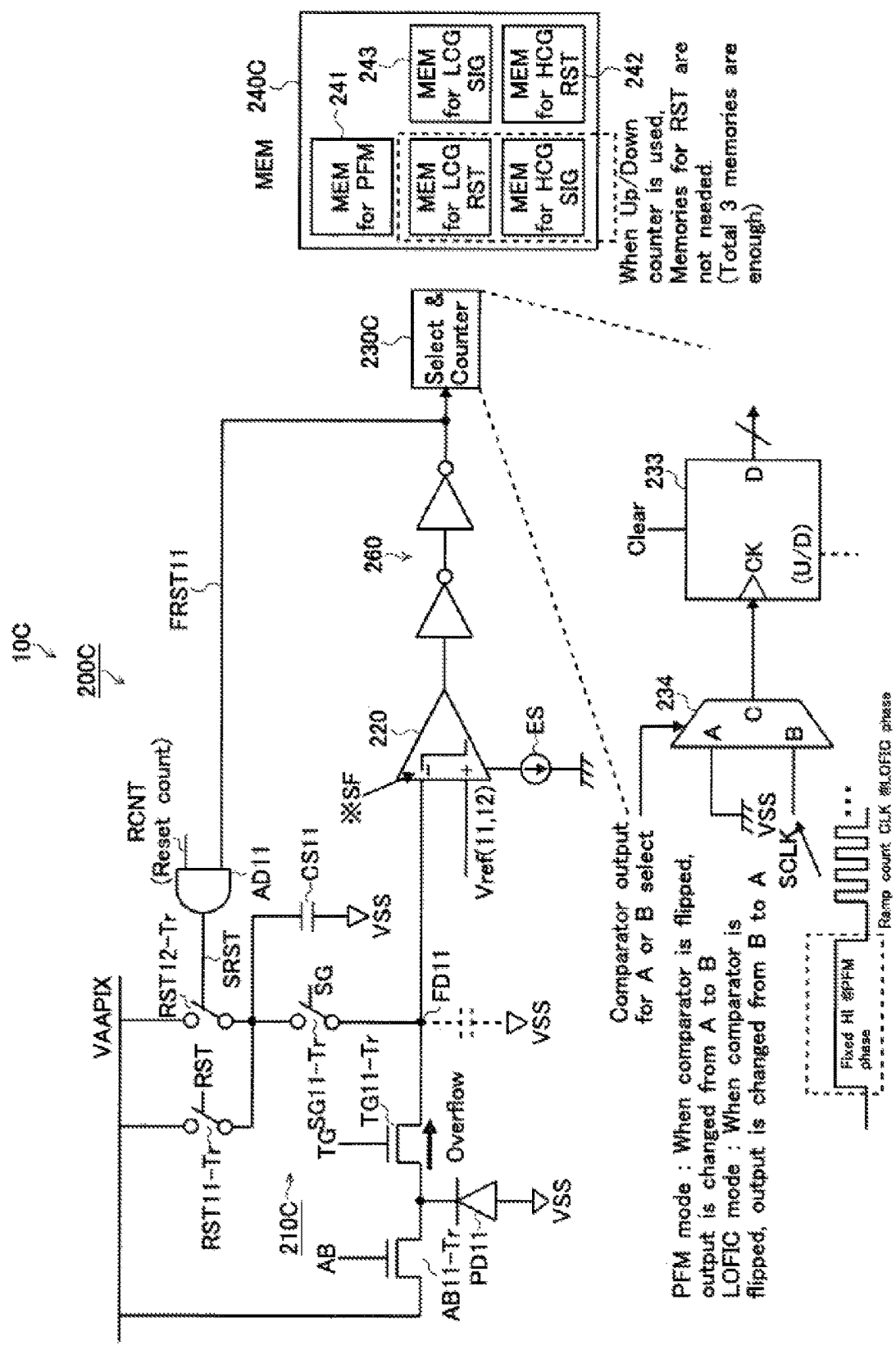
FIG. 18 is a circuit diagram showing an example configuration of a pixel circuit of a solid-state imaging device relating to a fourth embodiment of the present invention.

FIG. 18 is a circuit diagram showing an example configuration of a pixel circuit of a solid-state imaging device 10C relating to a fourth embodiment of the present invention.

The pixel circuit 200C of the solid-state imaging device 10C relating to the fourth embodiment differs from the pixel circuit 200 of the solid-state imaging device 10 relating to the above-described first embodiment in that the specific configuration of a selector counter circuit 230C is shown.

The pixel circuit 200C of the solid-state imaging device 10C relating to the fourth embodiment includes the selector counter circuit 230C, which is mainly constituted by an up-down (U/D) counter 233, and a selector 234 for selecting a signal to be input into the clock terminal of the up-down counter 233 based on the comparison result signal output from the comparator 220.

The selector 234 has a first input terminal A connected to the reference potential VSS, a second input terminal B connected to the feeding line of a clock signal SCLK, and an output terminal C connected to the clock terminal CK of the up-down counter 233. The clock signal SCLK is set at a fixed potential in the PFM mode and configured as a clock pulse having a predetermined frequency in the dual sampling read-out mode. If the output from the comparator 220 flips (is inverted) in the PFM mode, the selector 234 disconnects the connection between the output terminal C and the first input terminal A and establishes connection between the output terminal C and the second input terminal B. If the output from the comparator 220 flips in the dual sampling read-out mode, the selector 234 disconnects the connection between the output terminal C and the second input terminal B and establishes connection between the output terminal C and the first input terminal A.

In the fourth embodiment, the use of the up-down counter eliminates the necessity of the memory for storing the reset signals HCGRST and LCGRST. The memory circuit 240 is thus only required to include three memory units, i.e., the memory 241 for the PFM, the memory 242 for the HCG read-out signal HCGSIG, and the memory 243 for the LCG read-out signal LCGSIG.

The fourth embodiment thus can not only produce the same effects as the above-described first to third embodiments but also allow the memory to have a reduced size.

Fifth Embodiment

Figure 19:
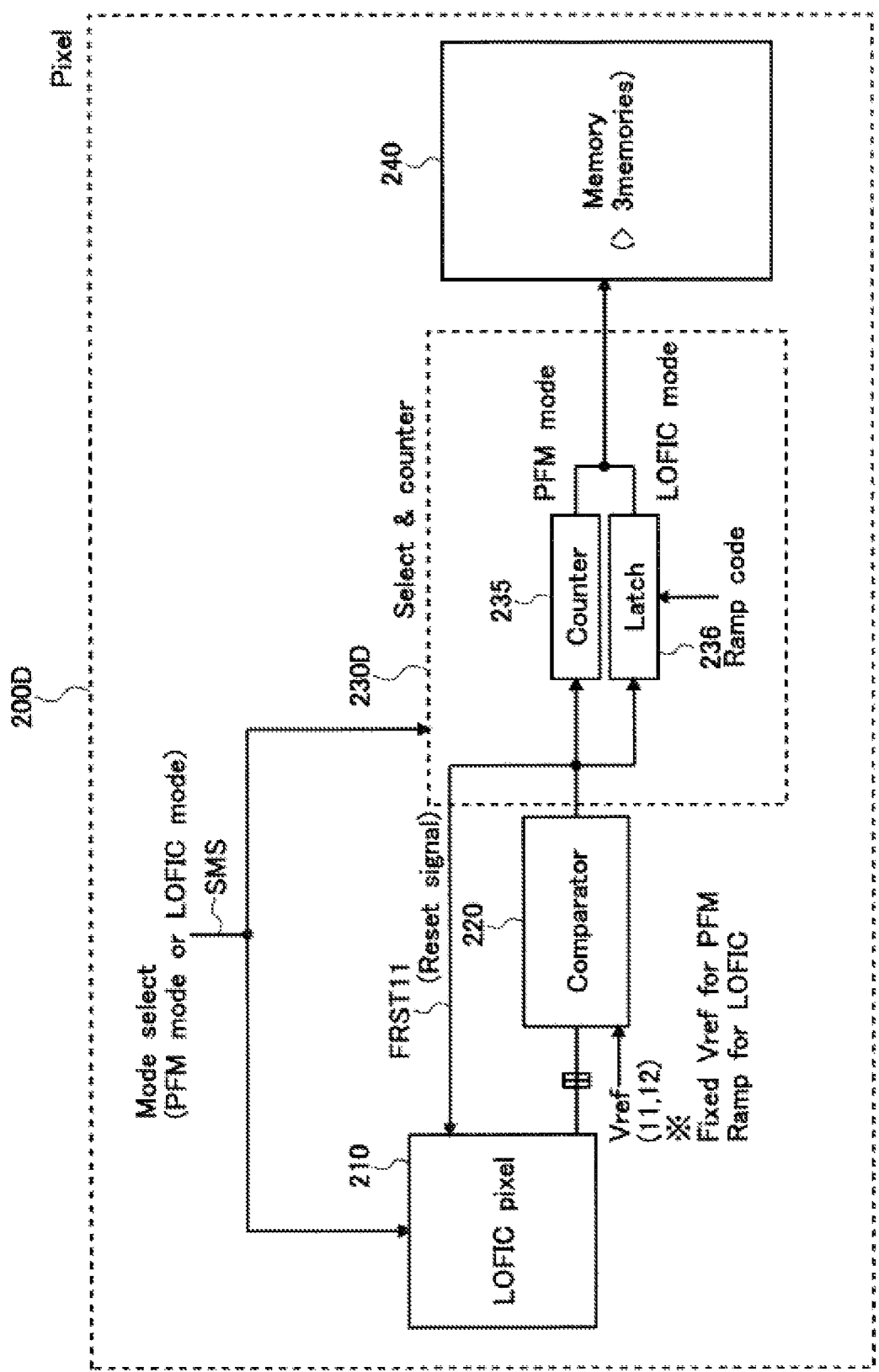
FIG. 19 is a circuit diagram showing an example configuration of a pixel circuit of a solid-state imaging device relating to a fifth embodiment of the present invention.

FIG. 19 is a circuit diagram showing an example configuration of a pixel circuit of a solid-state imaging device 10D relating to a fifth embodiment of the present invention.

The pixel circuit 200D of the solid-state imaging device 10D relating to the fifth embodiment differs from the pixel circuit 200 of the solid-state imaging device 10 relating to the above-described first embodiment in terms of the configuration of a selector counter circuit 230D.

The pixel circuit 200D of the solid-state imaging device 10D relating to the fifth embodiment includes the selector counter circuit 230D, which is mainly constituted by a counter 235 and a latch 236. In the selector counter circuit 230D, the counter 235 counts the first comparison result signal Vout11 from the comparator 220 in the PFM mode. In the selector counter circuit 230D, the latch 236 latches the second comparison result signal Vout12 in synchronization with a clock having a predetermined frequency in the dual sampling read-out mode.

The fifth embodiment can produce the same effects as the above-described first to third embodiments.

<Example of Application of Solid-State Imaging Device>

Figure 20:
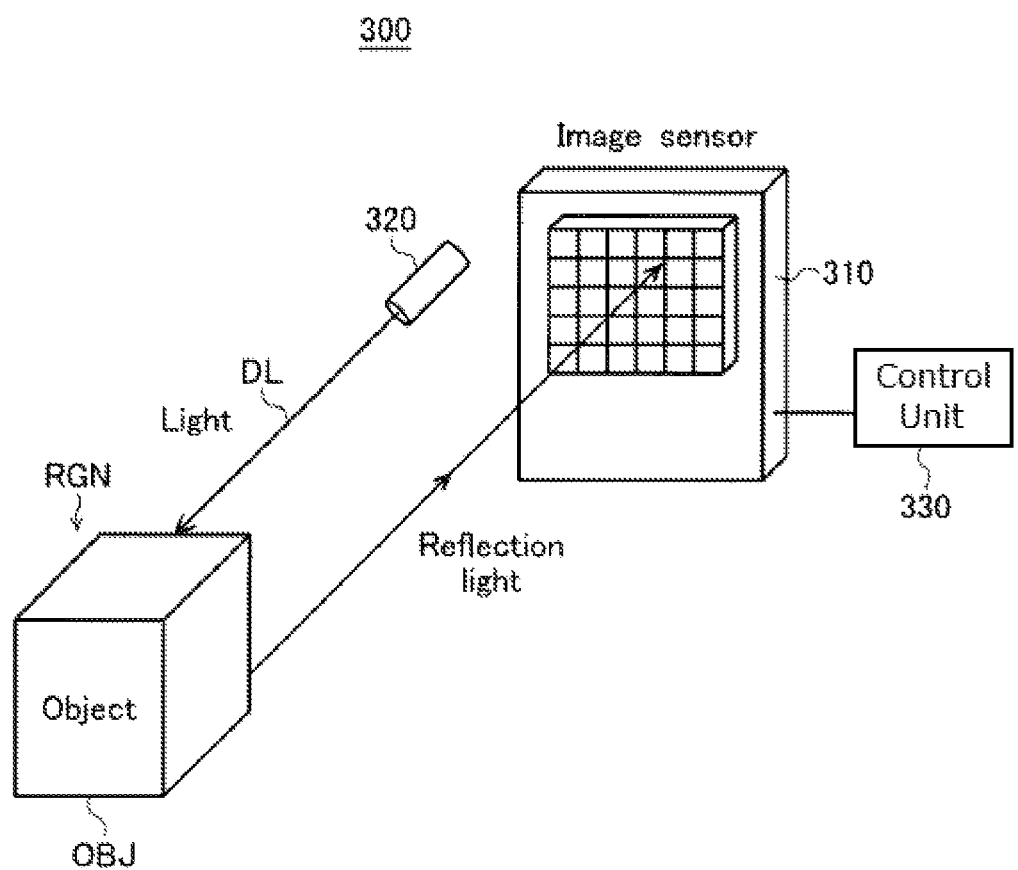
FIG. 20 illustrates an example of a device to which the solid-state imaging devices relating to the embodiments of the present invention are applied.
Figure 21:
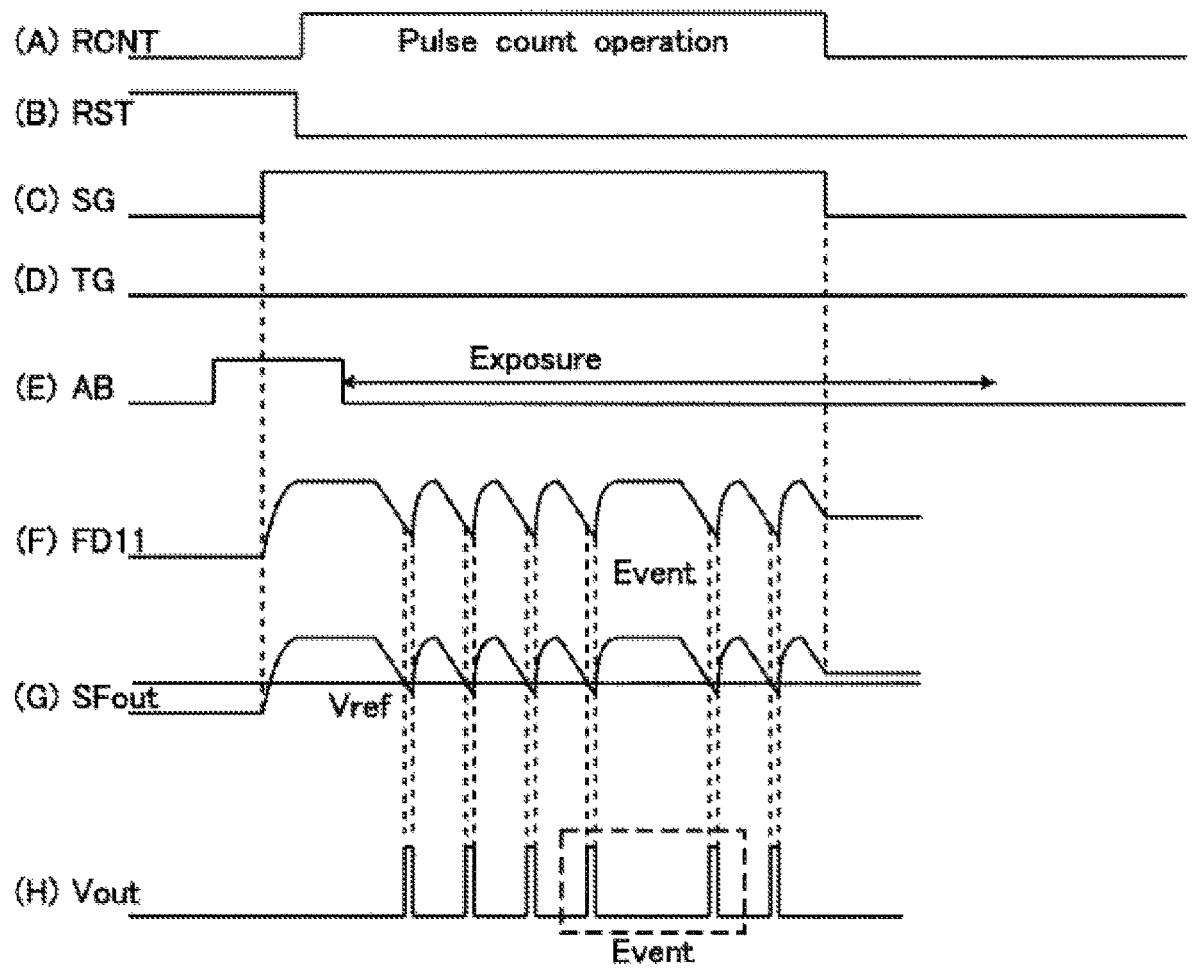
FIG. 21 is a timing chart to schematically show how the applied device shown in FIG. 20 works.

FIG. 20 illustrates an example of a device to which the solid-state imaging devices relating to the embodiments of the present invention are applied. FIG. 21 is a timing chart schematically showing how the applied device shown in FIG. 20 works.

The applied device 300 shown in FIG. 20 includes an image sensor 310, to which the solid-state imaging device 10 (10A to 10D) relating to any one of the first to fifth embodiments is applied, a light emitter 320 and a control unit 333.

The applied device 300 is configured to detect whether an object (event) OBJ is present or absent within a designated area by taking advantage of the repeatedly performed operations in the pixel circuits included in the image sensor 310. Specifically speaking, in the PFM mode, in the exposure period PEXP, overflowing of the charges from the photodiode PD11 to the floating diffusion FD11, self-resetting of the floating diffusion FD11 resulting from the feedback resetting through the comparison result signal Vout from the comparator 220, and counting of the number of times the floating diffusion FD11 is reset (the reset frequency of the floating diffusion FD11) by the selector counter circuit 230 are performed repeatedly A specific example is described. Under a very high illuminance condition, the light emitter 320 emits detection light DL toward a designated region RGN. If an object OBJ is absent within the designated region RGN, counting of the number of times the floating diffusion FD11 is reset (the reset frequency of the floating diffusion FD11) is repeatedly performed at predetermined intervals. If the object OBJ enters the designated region RGN, the object OBJ reflects the detection light DL, and the reflected light is received by the pixel part 20 including the pixel circuits 200. The intensity of the received light resultantly changes and takes a different value than when the object OBJ is absent, and it takes longer for the potential of the floating diffusion FD11 to diminish to the reference signal Vout11. Stated differently, if the object (event) OBJ is detected, the frequency of the pulse (the number of times) determined by the output from the comparator 220 changes. By detecting whether such a change occurs, the control unit 330 determines whether an event is detected.

<Examples of Application to Electronic Apparatuses>

The solid-state imaging devices 10, 10A, 10B, 10C and 10D described above can be applied, as an imaging device, to electronic apparatuses such as digital cameras, video cameras, mobile terminals, surveillance cameras, and medical endoscope cameras.

Figure 22:
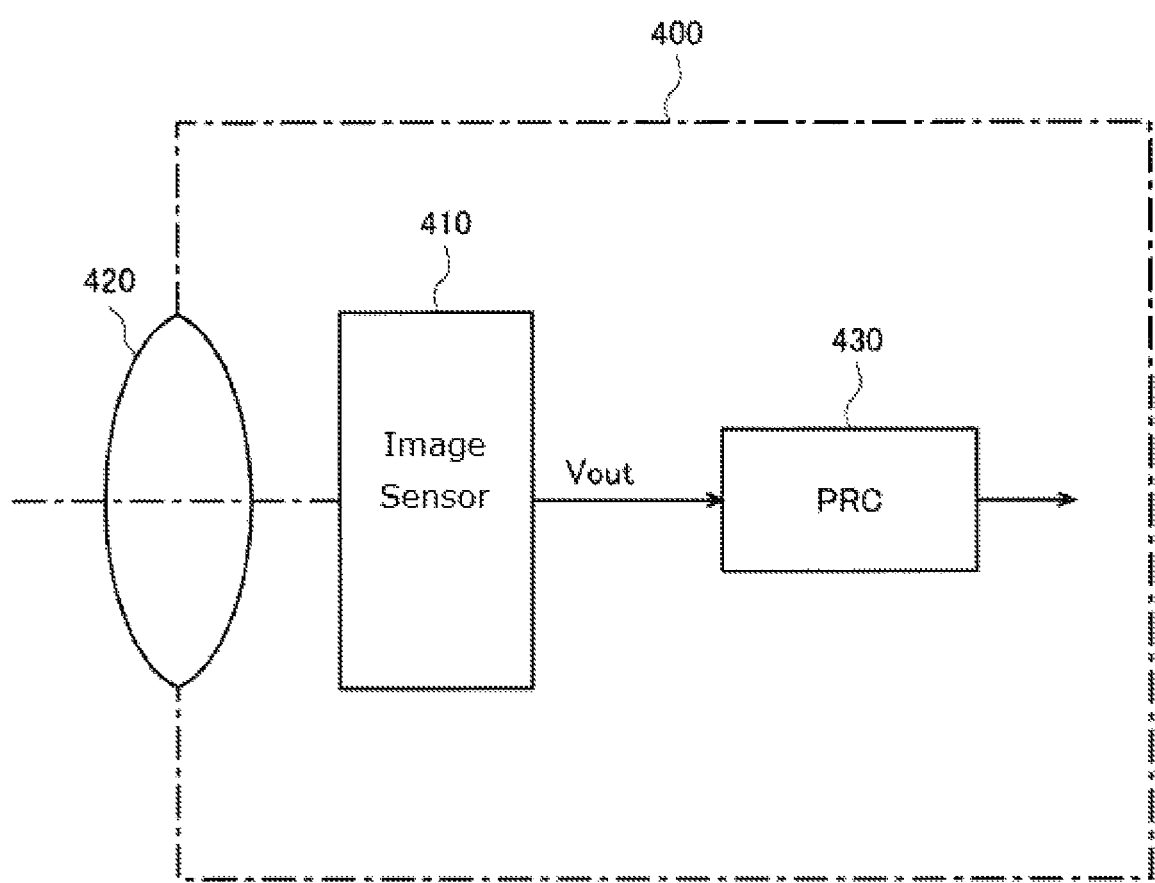
FIG. 22 shows an example configuration of an electronic apparatus to which the solid-state imaging devices relating to the embodiments of the present invention can be applied.

FIG. 22 shows an example configuration of an electronic apparatus including a camera system to which the solid-state imaging devices according to the embodiments of the present invention can be applied.

As shown in FIG. 22, an electronic apparatus 400 includes a CMOS image sensor 410 that can be constituted by the solid-state imaging devices 10, 10A, 10B, 10C and 10D relating to the embodiments of the present invention. The electronic apparatus 400 further includes an optical system (such as a lens) 420 for redirecting the incident light to the pixel region of the CMOS image sensor 410 (to form a subject image). The electronic apparatus 400 includes a signal processing circuit (PRC) 430 for processing the output signals from the CMOS image sensor 410.

The signal processing circuit 430 performs predetermined signal processing on the output signals from the CMOS image sensor 410. The image signals resulting from the processing in the signal processing circuit 430 can be handled in various manners. For example, the image signals can be displayed as a video image on a monitor having a liquid crystal display, printed by a printer, or recorded directly on a storage medium such as a memory card.

As described above, a high-performance, compact, and low-cost camera system can be provided that includes the above-described solid-state imaging device 10, 10A, 10B, 10C or 10D as the CMOS image sensor 410. Accordingly, the embodiments of the present invention can provide for electronic apparatuses such as surveillance cameras and medical endoscope cameras, which are used for applications where the cameras are installed under restricted conditions from various perspectives such as the installation size, the number of connectable cables, the length of cables and the installation height.

LIST OF REFERENCE NUMBERS 10, 10A, 10B, 10C, 10D: solid-state imaging device
20: pixel part
200: pixel circuit
PD11: photodiode
FD11: floating diffusion
TG11-Tr: transfer transistor
RST11-Tr, RST12-Tr: reset transistor
SF11-Tr: source follower transistor
SG11-Tr: storage transistor
CS11: storage capacitor
AB11-Tr: anti-blooming transistor
220, 220B, 220D: comparator
230, 230C, 230D: selector counter circuit
231: selector
232: counter
233: up-down counter
234: selector
235: counter
236: latch
300: applied device (event detecting device)
310: image sensor
320: light emitter
330: control unit
400: electronic apparatus
410: CMOS image sensor
420: optical system
430: signal processing circuit (PRC)

What is claimed is:

1. A solid-state imaging device comprising:
a readable pixel configured to perform photoelectric conversion, the readable pixel being configured to produce a readable signal corresponding to an illuminance condition of incident light;
a comparator configured to compare a voltage signal read from the readable pixel against a reference signal and output a comparison result signal corresponding to a result of the comparison; and
a selector counter circuit including a selector circuit and a counter circuit, the selector circuit being configured to select an external clock or an output from the comparator, the counter circuit being configured to count an output from the selector circuit,
wherein the readable pixel includes:
a photoelectric conversion element configured to store therein, in an exposure period, charges corresponding to an amount of the incident light;
a transfer element configured to remain in a non-conduction state during the exposure period and to remain in a conduction state during a transfer period to transfer the charges stored in the photoelectric conversion element;
a floating diffusion configured to hold the charges transferred thereto via the transfer element so that the charges are read out as a voltage signal;
at least one reset element configured to perform a reset operation of discharging the charges stored in the floating diffusion; and
an overflow path configured to allow charges overflowing from the photoelectric conversion element to overflow toward a region where the floating diffusion is formed,
wherein the readable pixel, the comparator, the selector circuit and the counter circuit:
under a high illuminance condition, if the voltage signal corresponding to the charges held in the floating diffusion reaches reference voltage, perform a pulse frequency modulation (PFM) mode, according to which the comparison result signal from the comparator is applied to perform feedback resetting to allow the floating diffusion to perform self-resetting, and the selector counter circuit counts a number of times the floating diffusion is reset (a reset frequency of the floating diffusion) in response to the comparison result signal; and
under a low illuminance condition, perform a dual sampling read-out mode using the charges stored in the photoelectric conversion element and overflow charges,
wherein the readable pixel and the selector counter circuit are configured to selectively operate in a PFM mode or dual sampling read-out mode according to a mode selection signal,
wherein, in the PFM mode, a first reference signal of a fixed level is fed to the comparator, and if the voltage signal corresponding to the charges held in the floating diffusion reaches the level of the first reference signal, the comparator outputs a first comparison result signal to the readable pixel and the selector counter circuit,
wherein, in the dual sampling read-out mode, a second reference signal having a ramp waveform showing a continuous change, is fed to the comparator, the comparator compares the voltage signal corresponding to the charges held in the floating diffusion against the second reference signal, and outputs a result of the comparison as a second comparison result signal to the selector counter circuit, and wherein the selector counter circuit:
in the PFM mode, counts the first comparison result signal from the comparator; and
in the dual sampling read-out mode, latches the second comparison result signal in synchronization with a clock having a predetermined frequency,
wherein the readable pixel is configured such that, in the PFM mode, the first comparison result signal is applied as a feedback reset signal to bring the reset element into a conduction state and to reset the floating diffusion.

2. The solid-state imaging device of claim 1, wherein the PFM mode is selected under a high illuminance condition and in an exposure period starting after the floating diffusion and the photoelectric conversion element are reset, and
wherein, following the PFM mode, the dual sampling read-out mode is selected.

3. The solid-state imaging device of claim 1, wherein, in the PFM mode, in the exposure period, overflowing of the charges from the photoelectric conversion element to the floating diffusion, self-resetting of the floating diffusion resulting from feedback resetting through the comparison result signal from the comparator, and counting of reset frequency of the floating diffusion by the selector counter circuit are performed repeatedly.

4. The solid-state imaging device of claim 3, wherein an occurrence of an event changes a reset pulse frequency.

5. A solid-state imaging device comprising:
a readable pixel configured to perform photoelectric conversion, the readable pixel being configured to produce a readable signal corresponding to an illuminance condition of incident light;
a comparator configured to compare a voltage signal read from the readable pixel against a reference signal and output a comparison result signal corresponding to a result of the comparison; and
a selector counter circuit including a selector circuit and a counter circuit, the selector circuit being configured to select an external clock or an output from the comparator, the counter circuit being configured to count an output from the selector circuit,
wherein the readable pixel includes:
a photoelectric conversion element configured to store therein, in an exposure period, charges corresponding to an amount of the incident light;
a transfer element configured to remain in a non-conduction state during the exposure period and to remain in a conduction state during a transfer period to transfer the charges stored in the photoelectric conversion element;
a floating diffusion configured to hold the charges transferred thereto via the transfer element so that the charges are read out as a voltage signal;
at least one reset element configured to perform a reset operation of discharging the charges stored in the floating diffusion; and
an overflow path configured to allow charges overflowing from the photoelectric conversion element to overflow toward a region where the floating diffusion is formed, wherein the readable pixel, the comparator, the selector circuit and the counter circuit:
under a high illuminance condition, if the voltage signal corresponding to the charges held in the floating diffusion reaches reference voltage, perform a pulse frequency modulation (PFM) mode, according to which the comparison result signal from the comparator is applied to perform feedback resetting to allow the floating diffusion to perform self-resetting, and the selector counter circuit counts a number of times the floating diffusion is reset (a reset frequency of the floating diffusion) in response to the comparison result signal; and
under a low illuminance condition, perform a dual sampling read-out mode using the charges stored in the photoelectric conversion element and overflow charges, wherein the readable pixel includes:
a storage element connected to the floating diffusion; and
a storage capacitance element configured to store the charges received from the floating diffusion via the storage element, and
wherein the storage element is arranged between the floating diffusion and the reset element.

6. The solid-state imaging device of claim 5, wherein, in the PFM mode, during the self-resetting, the reset element and the storage element remain in a conduction state to reset the floating diffusion and the storage capacitance element.

7. The solid-state imaging device of claim 5, comprising a source follower element serving as an output buffer part configured to convert the charges in the floating diffusion into a voltage signal at a level determined by an amount of the charges and outputting the voltage signal,
wherein, by selectively connecting together the floating diffusion and the storage capacitance element via the storage element, a capacitance of the floating diffusion is changed between a first capacitance and a second capacitance to change a conversion gain between a first conversion gain corresponding to the first capacitance and a second conversion gain corresponding to the second capacitance.

8. The solid-state imaging device of claim 7, comprising:
a pixel part having a plurality of the readable pixels arranged therein; and
a reading part configured to read pixel signals from the plurality of readable pixels in the pixel part,
wherein the reading part:
if the dual sampling read-out mode is selected following the PFM mode, keeps the storage element in a non-conduction state to disconnect the storage capacitance element from the floating diffusion, so that the charges in the floating diffusion are separated from the charges in the storage capacitance element to switch the gain of the floating diffusion to the first conversion gain corresponding to the first capacitance;
in a first reset read-out period following the reset operation, performs a first conversion gain reset read-out operation of reading from the source follower element serving as the output buffer part a first read-out reset signal produced through conversion with the first conversion gain corresponding to the first capacitance of the floating diffusion and processes the first read-out reset signal in a predetermined manner;
in a first read-out period following a first transfer period following the first reset read-out period, performs a first conversion gain read-out operation of reading from the source follower element serving as the output buffer part a first read-out signal produced through conversion with the first conversion gain corresponding to the first capacitance of the floating diffusion and processing the first read-out signal in a predetermined manner;

after performing the first conversion gain read-out operation, keeps the storage element in a conduction state to connect the storage capacitance element to the floating diffusion, so that the charges in the floating diffusion and the charges in the storage capacitance element are combined together to switch the gain of the floating diffusion to the second conversion gain corresponding to the second capacitance;

in a second read-out period following a second transfer period following the first read- out period, performs a second conversion gain read-out operation of reading from the source follower element serving as the output buffer part a second read-out signal produced through conversion with the second conversion gain corresponding to the second capacitance of the floating diffusion and processing the second read-out signal in a predetermined manner; and after the reset element resets the floating diffusion, performs a second conversion gain reset read-out operation of reading from the source follower element serving as the output buffer part a second read-out reset signal produced through conversion with the second conversion gain corresponding to the second capacitance of the floating diffusion serving as an output node and processing the second read-out reset signal in a predetermined manner.

9. The solid-state imaging device of claim 8, wherein the reading part performs the first conversion gain reset read-out operation in the exposure period.

10. The solid-state imaging device of claim 8, wherein the reading part performs the second conversion gain reset read-out operation and the second conversion gain read-out operation under a very low illuminance condition.

11. The solid-state imaging device of claim 8, wherein the reading part performs the first conversion gain reset read-out operation, the first conversion gain read-out operation, the second conversion gain read-out operation and the second conversion gain reset read-out operation under a medium illuminance condition.

12. The solid-state imaging device of claim 7, wherein the source follower element is constituted by a source follower transistor having a gate connected to the floating diffusion and a drain connected to a predetermined potential, and
wherein the comparator includes:
input terminals one of which is connected to a source of the source follower transistor via a coupling capacitor and the other of which is connected to an input line of the reference signal; and
an auto-zero switch connected between an output terminal of the comparator and the input terminal of the comparator connected to the source of the source follower transistor.

13. A solid-state imaging device comprising:
a readable pixel configured to perform photoelectric conversion, the readable pixel being configured to produce a readable signal corresponding to an illuminance condition of incident light;
a comparator configured to compare a voltage signal read from the readable pixel against a reference signal and output a comparison result signal corresponding to a result of the comparison; and
a selector counter circuit including a selector circuit and a counter circuit, the selector circuit being configured to select an external clock or an output from the comparator, the counter circuit being configured to count an output from the selector circuit,
wherein the readable pixel includes:
a photoelectric conversion element configured to store therein, in an exposure period, charges corresponding to an amount of the incident light;
a transfer element configured to remain in a non-conduction state during the exposure period and to remain in a conduction state during a transfer period to transfer the charges stored in the photoelectric conversion element;
a floating diffusion configured to hold the charges transferred thereto via the transfer element so that the charges are read out as a voltage signal;
at least one reset element configured to perform a reset operation of discharging the charges stored in the floating diffusion; and
an overflow path configured to allow charges overflowing from the photoelectric conversion element to overflow toward a region where the floating diffusion is formed,
wherein the readable pixel, the comparator, the selector circuit and the counter circuit:
under a high illuminance condition, if the voltage signal corresponding to the charges held in the floating diffusion reaches reference voltage, perform a pulse frequency modulation (PFM) mode, according to which the comparison result signal from the comparator is applied to perform feedback resetting to allow the floating diffusion to perform self-resetting, and the selector counter circuit counts a number of times the floating diffusion is reset (a reset frequency of the floating diffusion) in response to the comparison result signal; and
under a low illuminance condition, perform a dual sampling read-out mode using the charges stored in the photoelectric conversion element and overflow charges, wherein the selector counter circuit includes:
a counter; and
a selector configured to select a signal to be input into the counter in response to a mode selection signal,
wherein the selector:
when the mode selection signal indicates the PFM mode, feeds the comparison result signal from the comparator to the counter; and
when the mode selection signal indicates the dual sampling read-out mode, feeds a clock pulse having a predetermined frequency to the counter, and
wherein the counter:
in the PFM mode, counts the comparison result signal from the comparator; and
in the dual sampling read-out mode, latches a second comparison result signal in synchronization with the clock pulse.

14. A solid-state imaging device comprising:
a readable pixel configured to perform photoelectric conversion, the readable pixel being configured to produce a readable signal corresponding to an illuminance condition of incident light;
a comparator configured to compare a voltage signal read from the readable pixel against a reference signal and output a comparison result signal corresponding to a result of the comparison; and
a selector counter circuit including a selector circuit and a counter circuit, the selector circuit being configured to select an external clock or an output from the comparator, the counter circuit being configured to count an output from the selector circuit, wherein the readable pixel includes:
- a photoelectric conversion element configured to store therein, in an exposure period, charges corresponding to an amount of the incident light;
- a transfer element configured to remain in a non-conduction state during the exposure period and to remain in a conduction state during a transfer period to transfer the charges stored in the photoelectric conversion element;
- a floating diffusion configured to hold the charges transferred thereto via the transfer element so that the charges are read out as a voltage signal;
- at least one reset element configured to perform a reset operation of discharging the charges stored in the floating diffusion; and
- an overflow path configured to allow charges overflowing from the photoelectric conversion element to overflow toward a region where the floating diffusion is formed, wherein the readable pixel, the comparator, the selector circuit and the counter circuit:
- under a high illuminance condition, if the voltage signal corresponding to the charges held in the floating diffusion reaches reference voltage, perform a pulse frequency modulation (PFM) mode, according to which the comparison result signal from the comparator is applied to perform feedback resetting to allow the floating diffusion to perform self-resetting, and the selector counter circuit counts a number of times the floating diffusion is reset (a reset frequency of the floating diffusion) in response to the comparison result signal; and
- under a low illuminance condition, perform a dual sampling read-out mode using the charges stored in the photoelectric conversion element and overflow charges, wherein the selector counter circuit includes:

an up-down counter; and
a selector configured to select a signal to be input into a clock terminal of the up-down counter in response to the comparison result signal output from the comparator, wherein the selector has:
a first input terminal connected to a reference potential;
a second input terminal configured to be set at a fixed potential in the PFM mode and configured to be connected to a feeding line of a signal selected as a clock pulse having a predetermined frequency in the dual sampling read-out mode; and
an output terminal connected to a clock terminal of the up-down counter, wherein, if the output from the comparator flips in the PFM mode, the selector disconnects connection between the output terminal and the first input terminal and establishes connection between the output terminal and the second input terminal, and wherein, if the output from the comparator flips in the dual sampling read-out mode, the selector disconnects connection between the output terminal and the second input terminal and establishes connection between the output terminal and the first input terminal.

15. A solid-state imaging device comprising:
- a readable pixel configured to perform photoelectric conversion, the readable pixel being configured to produce a readable signal corresponding to an illuminance condition of incident light;
- a comparator configured to compare a voltage signal read from the readable pixel against a reference signal and output a comparison result signal corresponding to a result of the comparison; and
- a selector counter circuit including a selector circuit and a counter circuit, the selector circuit being configured to select an external clock or an output from the comparator, the counter circuit being configured to count an output from the selector circuit, wherein the readable pixel includes:
- a photoelectric conversion element configured to store therein, in an exposure period, charges corresponding to an amount of the incident light;
- a transfer element configured to remain in a non-conduction state during the exposure period and to remain in a conduction state during a transfer period to transfer the charges stored in the photoelectric conversion element;
- a floating diffusion configured to hold the charges transferred thereto via the transfer element so that the charges are read out as a voltage signal;
- at least one reset element configured to perform a reset operation of discharging the charges stored in the floating diffusion; and
- an overflow path configured to allow charges overflowing from the photoelectric conversion element to overflow toward a region where the floating diffusion is formed, wherein the readable pixel, the comparator, the selector circuit and the counter circuit:
- under a high illuminance condition, if the voltage signal corresponding to the charges held in the floating diffusion reaches reference voltage, perform a pulse frequency modulation (PFM) mode, according to which the comparison result signal from the comparator is applied to perform feedback resetting to allow the floating diffusion to perform self-resetting, and the selector counter circuit counts a number of times the floating diffusion is reset (a reset frequency of the floating diffusion) in response to the comparison result signal; and
- under a low illuminance condition, perform a dual sampling read-out mode using the charges stored in the photoelectric conversion element and overflow charges, wherein the selector counter circuit includes:

a counter; and
a latch,
wherein, in the PFM mode, the counter counts a first comparison result signal from the comparator, and
wherein, in the dual sampling read-out mode, the latch latches a second comparison result signal in synchronization with a clock having a predetermined frequency.

16. A solid-state imaging device comprising:
- a readable pixel configured to perform photoelectric conversion, the readable pixel being configured to produce a readable signal corresponding to an illuminance condition of incident light;
- a comparator configured to compare a voltage signal read from the readable pixel against a reference signal and output a comparison result signal corresponding to a result of the comparison; and a selector counter circuit including a selector circuit and a counter circuit, the selector circuit being configured to select an external clock or an output from the comparator, the counter circuit being configured to count an output from the selector circuit, wherein the readable pixel includes:
    a photoelectric conversion element configured to store therein, in an exposure period, charges corresponding to an amount of the incident light;
    a transfer element configured to remain in a non-conduction state during the exposure period and to remain in a conduction state during a transfer period to transfer the charges stored in the photoelectric conversion element;
    a floating diffusion configured to hold the charges transferred thereto via the transfer element so that the charges are read out as a voltage signal;
    at least one reset element configured to perform a reset operation of discharging the charges stored in the floating diffusion; and
    an overflow path configured to allow charges overflowing from the photoelectric conversion element to overflow toward a region where the floating diffusion is formed, wherein the readable pixel, the comparator, the selector circuit and the counter circuit:
    under a high illuminance condition, if the voltage signal corresponding to the charges held in the floating diffusion reaches reference voltage, perform a pulse frequency modulation (PFM) mode, according to which the comparison result signal from the comparator is applied to perform feedback resetting to allow the floating diffusion to perform self-resetting, and the selector counter circuit counts a number of times the floating diffusion is reset (a reset frequency of the floating diffusion) in response to the comparison result signal; and
    under a low illuminance condition, perform a dual sampling read-out mode using the charges stored in the photoelectric conversion element and overflow charges, comprising a gate element configured to transfer the charges stored in the photoelectric conversion element toward a region other than the region where the floating diffusion is formed.

17. A method for driving a solid-state imaging device, the solid-state imaging device including:

a readable pixel configured to perform photoelectric conversion, the readable pixel being configured to produce a readable signal corresponding to an illuminance condition of incident light;

a comparator configured to compare a voltage signal read from the readable pixel against a reference signal and output a comparison result signal corresponding to a result of the comparison; and a selector counter circuit including a selector circuit and a counter circuit, the selector circuit being configured to select an external clock or an output from the comparator, the counter circuit being configured to count an output from the selector circuit, wherein the readable pixel includes:
    a photoelectric conversion element configured to store therein, in an exposure period, charges corresponding to an amount of the incident light;
    a transfer element configured to remain in a non-conduction state during the exposure period and to remain in a conduction state during a transfer period to transfer the charges stored in the photoelectric conversion element;
    a floating diffusion configured to hold the charges transferred thereto via the transfer element so that the charges are read out as a voltage signal;
    at least one reset element configured to perform a reset operation of discharging the charges stored in the floating diffusion; and
    an overflow path configured to allow charges overflowing from the photoelectric conversion element to overflow toward a region where the floating diffusion is formed, wherein, under a high illuminance condition, if the voltage signal corresponding to the charges held in the floating diffusion reaches reference voltage, a pulse frequency modulation (PFM) mode is performed, according to which the comparison result signal from the comparator is applied to perform feedback resetting to allow the floating diffusion to perform self-resetting, and the selector counter circuit counts a reset frequency of the floating diffusion in response to the comparison result signal, and wherein, under a low illuminance condition, a dual sampling read-out mode is performed using the charges stored in the photoelectric conversion element and overflow charges, wherein selectively operate the readable pixel and the selector counter circuit in the PFM mode or the dual sampling read-out mode according to a mode selection signal, wherein, in the PFM mode, feed a first reference signal of a fixed level to the comparator, and if the voltage signal corresponding to the charges held in the floating diffusion reaches the level of the first reference signal, output a first comparison result signal to the readable pixel and the selector counter circuit, wherein, in the dual sampling read-out mode, feed a second reference signal having a ramp waveform showing a continuous change to the comparator, compare the voltage signal corresponding to the charges held in the floating diffusion against the second reference signal, and output a result of the comparison as a second comparison result signal to the selector counter circuit, and wherein, in the PFM mode, count the first comparison result signal from the comparator; and wherein, in the dual sampling read-out mode, latch the second comparison result signal in synchronization with a clock having a predetermined frequency, wherein, in the PFM mode, apply the first comparison result signal as a feedback reset signal to bring the reset element into a conduction state and to reset the floating diffusion.

18. An electronic apparatus comprising:

a solid-state imaging device; and an optical system for forming a subject image on the solid-state imaging device, wherein the solid-state imaging device includes:

a readable pixel configured to perform photoelectric conversion, the readable pixel being configured to produce a readable signal corresponding to an illuminance condition of incident light;

a comparator configured to compare a voltage signal read from the readable pixel against a reference signal and output a comparison result signal corresponding to a result of the comparison; and a selector counter circuit including a selector circuit and a counter circuit, the selector circuit being configured to select an external clock or an output from the comparator, the counter circuit being configured to count an output from the selector circuit, wherein the readable pixel includes:

a photoelectric conversion element configured to store therein, in an exposure period, charges corresponding to an amount of the incident light;

a transfer element configured to remain in a non-conduction state during the exposure period and to remain in a conduction state during a transfer period to transfer the charges stored in the photoelectric conversion element;

a floating diffusion configured to hold the charges transferred thereto via the transfer element so that the charges are read out as a voltage signal;

at least one reset element configured to perform a reset operation of discharging the charges stored in the floating diffusion; and an overflow path configured to allow charges overflowing from the photoelectric conversion element to overflow toward a region where the floating diffusion is formed, wherein the readable pixel, the comparator, the selector circuit and the counter circuit:

under a high illuminance condition, if the voltage signal corresponding to the charges held in the floating diffusion reaches reference voltage, perform a pulse frequency modulation (PFM) mode, according to which the comparison result signal from the comparator is applied to perform feedback resetting to allow the floating diffusion to perform self-resetting, and the selector counter circuit counts a reset frequency of the floating diffusion in response to the comparison result signal; and under a low illuminance condition, perform a dual sampling read-out mode using the charges stored in the photoelectric conversion element and overflow charges, wherein the readable pixel and the selector counter circuit are configured to selectively operate in a PFM mode or dual sampling read-out mode according to a mode selection signal, wherein, in the PFM mode, a first reference signal of a fixed level is fed to the comparator, and if the voltage signal corresponding to the charges held in the floating diffusion reaches the level of the first reference signal, the comparator outputs a first comparison result signal to the readable pixel and the selector counter circuit, wherein, in the dual sampling read-out mode, a second reference signal having a ramp waveform showing a continuous change, is fed to the comparator, the comparator compares the voltage signal corresponding to the charges held in the floating diffusion against the second reference signal, and outputs a result of the comparison as a second comparison result signal to the selector counter circuit, and wherein the selector counter circuit:

in the PFM mode, counts the first comparison result signal from the comparator; and in the dual sampling read-out mode, latches the second comparison result signal in synchronization with a clock having a predetermined frequency, wherein the readable pixel is configured such that, in the PFM mode, the first comparison result signal is applied as a feedback reset signal to bring the reset element into a conduction state and to reset the floating diffusion.

\* \* \* \* \*